United States Patent
Golitschek Edler von Elbwart et al.

(10) Patent No.: US 10,827,479 B2
(45) Date of Patent: *Nov. 3, 2020

(54) RESOURCE ALLOCATION FOR TRANSMISSIONS ON UNLICENSED CARRIERS

(71) Applicant: Panasonic Intellectual Property Corporation of America, Torrance, CA (US)

(72) Inventors: Alexander Golitschek Edler von Elbwart, Darmstadt (DE); Michael Einhaus, Darmstadt (DE); Hidetoshi Suzuki, Kanagawa (JP); Sujuan Feng, Frankfurt (DE); Lilei Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/358,451

(22) Filed: Mar. 19, 2019

(65) Prior Publication Data

US 2019/0274122 A1 Sep. 5, 2019

Related U.S. Application Data

(63) Continuation of application No. 15/521,872, filed as application No. PCT/CN2014/090610 on Nov. 7, 2014, now Pat. No. 10,292,148.

(51) Int. Cl.
*H04W 4/00* (2018.01)
*H04W 72/04* (2009.01)
(Continued)

(52) U.S. Cl.
CPC ......... *H04W 72/042* (2013.01); *H04W 16/14* (2013.01); *H04W 72/1289* (2013.01); *H04W 72/044* (2013.01)

(58) Field of Classification Search
None
See application file for complete search history.

(56) References Cited

U.S. PATENT DOCUMENTS

| | | | |
|---|---|---|---|
| 9,276,717 | B2 | 3/2016 | Oizumi et al. |
| 9,628,236 | B2 | 4/2017 | Takeda et al. |

(Continued)

FOREIGN PATENT DOCUMENTS

| | | |
|---|---|---|
| CN | 102457929 A | 5/2012 |
| WO | 2013/096563 A1 | 6/2013 |

(Continued)

OTHER PUBLICATIONS

3GPP Organizational Partners, "3$^{rd}$ Generation Partnership Project; Technical Specification Group Radio Access Network; Evolved Universal Terrestrial Radio Access (E-UTRA); Multiplexing and channel coding (Release11)," 3GPP TS 36.212 V11.5.1, Sep. 2014, 7 pages.

(Continued)

*Primary Examiner* — Clemence S Han
(74) *Attorney, Agent, or Firm* — Seed IP Law Group LLP

(57) ABSTRACT

The disclosure relates to a method for allocating radio resources to a user terminal for performing communication between a radio control entity and the user terminal in a communication system. At least first predetermined radio resources are configured in the user terminal for use in connection with a particular carrier and are associated with a particular format of a downlink control information, DCI, message. The user terminal receives a DCI message of the particular format from the radio control entity. Upon receiv- (Continued)

ing the DCI message of the particular format, the user terminal identifies the first predetermined radio resources associated with this received DCI message, and using the identified first predetermined radio resources for communication between the user terminal and the radio control entity via the particular carrier. The particular carrier can be an unlicensed carrier.

18 Claims, 9 Drawing Sheets

(51) Int. Cl.
*H04W 16/14* (2009.01)
*H04W 72/12* (2009.01)

(56) References Cited

U.S. PATENT DOCUMENTS

| | | | |
|---|---|---|---|
| 2013/0107819 A1* | 5/2013 | Noh | H04L 5/0094 370/329 |
| 2013/0121274 A1 | 5/2013 | Chen et al. | |
| 2014/0016596 A1* | 1/2014 | Kim | H04L 5/001 370/329 |
| 2014/0036889 A1 | 2/2014 | Kim et al. | |
| 2014/0211767 A1* | 7/2014 | Lunttila | H04W 72/1289 370/336 |
| 2016/0100382 A1* | 4/2016 | He | H04L 5/0055 370/329 |

FOREIGN PATENT DOCUMENTS

| | | |
|---|---|---|
| WO | 2013/168562 A1 | 11/2013 |
| WO | 2013/069218 A1 | 4/2015 |

OTHER PUBLICATIONS

3GPP TS 36.211 V8.9.0, $3^{rd}$ Generation Partnership Project; Technical Specification Group Radio Access Network; Evolved Universal Terrestrial Radio Access (E-UTRA); Physical Channels and Modulation (Release 8), Dec. 2009, 83 pages.
3GPP TS 36.212 V12.2.0, "$3^{rd}$ Generation Partnership Project; Technical Specification Group Radio Access Network; Evolved Universal Terrestrial Radio Access (E-UTRA); Multiplexing and channel coding (Release 12)," Sep. 2014, 89 pages.
3GPP TS 36.213 V12.3.0 "$3^{rd}$ Generation Partnership Project; Technical Specification Group Radio Access Network; Evolved Universal Terrestrial Radio Access (E-UTRA); Physical layer procedures (Release 12)," Sep. 2014, 212 pages.
3GPP TS 36.321 V12.3.0 "$3^{rd}$ Generation Partnership Project; Technical Specification Group Radio Access Network; Evolved Universal Terrestrial Radio Access (E-UTRA); Medium Access Control (MAC) protocol specification (Release 12)," Sep. 2014, 57 pages.
3GPP TS 36.331 V12.3.0 "$3^{rd}$ Generation Partnership Project; Technical Specification Group Radio Access Network; Evolved Universal Terrestrial Radio Access (E-UTRA); Radio Resource Control (RRC); Protocol specification (Release 12)," Sep. 2014, 378 pages.
Alcatel-Lucent et al., "Regulatory Requirements for Unlicensed Spectrum," R1-144348 (R1-144226), 3GPP TSG RAN WG1 Meeting #78bis, Agenda Item: 7.3.2.1, Ljubljana, Slovenia, Oct. 6-10, 2014, 26 pages.
International Search Report, dated Aug. 5, 2015, for corresponding International Application No. PCT/CN2014/090610, 2 pages.
Notice of Reasons for Rejection, dated Jun. 5, 2018, for Japanese Application No. 2017-522603, 40 pages (with English translation).
Sesia et al., "LTE The UMTS Long Term Evolution—From Theory to Practice," Wiley, 2011, Chapter 9.3, 24 pages.

* cited by examiner

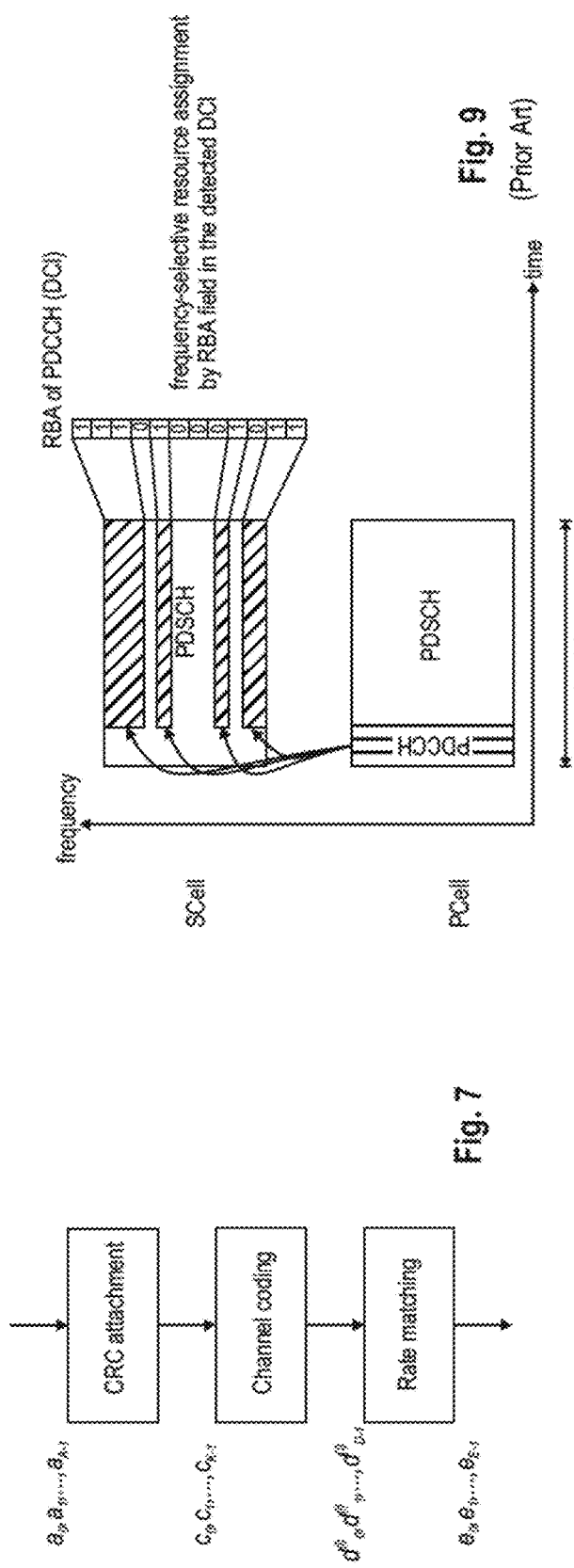
Fig. 7
Fig. 9 (Prior Art)
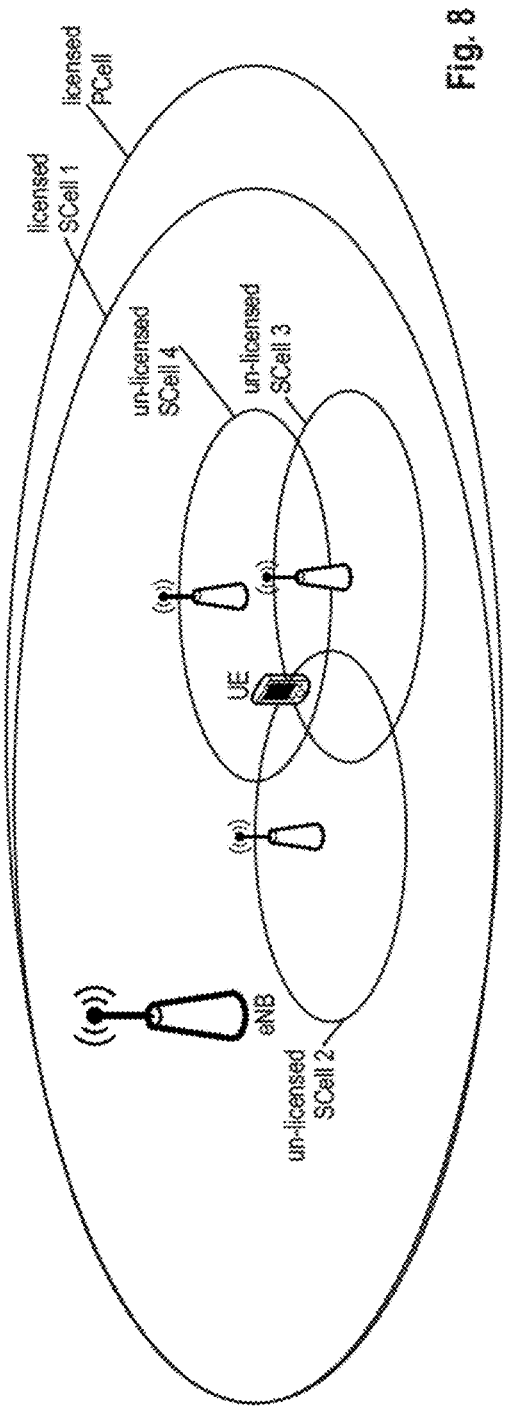
Fig. 8

RESOURCE ALLOCATION FOR TRANSMISSIONS ON UNLICENSED CARRIERS

BACKGROUND

Technical Field

The present disclosure relates to methods for allocating radio resources to a user terminal for performing communication, particularly on unlicensed carriers. The present disclosure is also providing the user terminal and radio control entity for participating in the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMES/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers as also shown in FIG. 4.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as $N_{symb}^{DL}$ consecutive OFDM symbols in the time domain (e.g., 7 OFDM symbols) and $N_{sc}^{RB}$ consecutive subcarriers in the frequency domain as exemplified in FIG. 4 (e.g., 12 subcarriers for a component carrier). In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same $N_{sc}^{RB}$ consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier do not exceed the supported bandwidth of a LTE Rel. 8/9 cell. Not all component carriers aggregated by a user equipment may necessarily be Rel. 8/9 compatible. Existing mechanism (e.g., barring) may be used to avoid Rel-8/9 user equipments to camp on a component carrier.

A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC).

The configuration and reconfiguration, as well addition and removal, as of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover).

When a user equipment is configured with carrier aggregation there is at least one pair of uplink and downlink component carriers that is always active. The downlink component carrier of that pair might be also referred to as 'DL anchor carrier'. Same applies also for the uplink.

When carrier aggregation is configured, a user equipment may be scheduled on multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking, established by RRC signaling, between uplink and downlink component carriers allows identifying the uplink component carrier for which the grant applies when there is no-cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Uplink Access Scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and assumed improved coverage (higher data rates for a given terminal peak power). During each time interval, Node B assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (Node B), aided by insertion of a cyclic prefix in the transmitted signal.

The basic physical resource used for data transmission consists of a frequency resource of size $BW_{grant}$ during one time interval, e.g., a sub-frame of 0.5 ms, onto which coded information bits are mapped. It should be noted that a sub-frame, also referred to as transmission time interval (TTI), is the smallest time interval for user data transmission. It is however possible to assign a frequency resource $BW_{grant}$ over a longer time period than one TTI to a user by concatenation of sub-frames.

UL Scheduling Scheme for LTE

The uplink scheme allows for both scheduled access, i.e., controlled by eNB, and contention-based access.

In case of scheduled access, the UE is allocated a certain frequency resource for a certain time (i.e., a time/frequency resource) for uplink data transmission. However, some time/frequency resources can be allocated for contention-based access. Within these time/frequency resources, UEs can transmit without first being scheduled. One scenario where UE is making a contention-based access is for example the random access, i.e., when UE is performing initial access to a cell or for requesting uplink resources.

For the scheduled access Node B scheduler assigns a user a unique frequency/time resource for uplink data transmission. More specifically the scheduler determines
 which UE(s) is (are) allowed to transmit,
 which physical channel resources (frequency),
 Transport format (Modulation Coding Scheme (MCS)) to be used by the mobile terminal for transmission The allocation information is signaled to the UE via a scheduling grant, sent on the L1/L2 control channel. For simplicity reasons this channel is called uplink grant channel in the following. A scheduling grant message contains at least information which part of the frequency band the UE is allowed to use, the validity period of the grant, and the transport format the UE has to use for the upcoming uplink transmission. The shortest validity period is one sub-frame. Additional information may also be included in the grant message, depending on the selected scheme. Only "per UE" grants are used to grant the right to transmit on the UL-SCH (i.e., there are no "per UE per RB" grants). Therefore the UE needs to distribute the allocated resources among the radio bearers according to some rules. Unlike in HSUPA, there is no UE based transport format selection. The eNB decides the transport format based on some information, e.g., reported scheduling information and QoS info, and UE has to follow the selected transport format. In HSUPA the Node B assigns the maximum uplink resource, and UE selects accordingly the actual transport format for the data transmissions.

Since the scheduling of radio resources is the most important function in a shared channel access network for determining Quality of service, there are a number of requirements that should be fulfilled by the UL scheduling scheme for LTE in order to allow for an efficient QoS management.
 Starvation of low priority services should be avoided
 Clear QoS differentiation for radio bearers/services should be supported by the scheduling scheme
 The UL reporting should allow fine granular buffer reports (e.g., per radio bearer or per radio bearer group) in order to allow the eNB scheduler to identify for which Radio Bearer/service data is to be sent.
 It should be possible to make clear QoS differentiation between services of different users
 It should be possible to provide a minimum bit rate per radio bearer As can be seen from above list one essential aspect of the LTE scheduling scheme is to provide mechanisms with which the operator can control the partitioning of its aggregated cell capacity between the radio bearers of the different QoS classes. The QoS class of a radio bearer is identified by the QoS profile of the corresponding SAE bearer signaled from AGW to eNB as described before. An operator can then allocate a certain amount of its aggregated cell capacity to the aggregated traffic associated with radio bearers of a certain QoS class. The main goal of employing this class-based approach is to be able to differentiate the treatment of packets depending on the QoS class they belong to.

Layer 1/Layer 2 (L1/L2) Control Signaling

In order to inform the scheduled users about their allocation status, transport format and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH. Furthermore, Release 11 introduced an EPDCCH that fulfills basically the same function as the PDCCH, i.e., conveys L1/L2 control signaling, even though the detailed transmission methods are different from the PDCCH. Further details can be found particularly in the current versions of 3GPP TS 36.211 and 36.213, incorporated herein by reference. Consequently, most items outlined in the background and the embodiments apply to PDCCH as well as EPDCCH, or other means of conveying L1/L2 control signals, unless specifically noted.

Generally, the information sent on the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (Resource Blocks, RBs) on which a user is allocated. Alternatively this information is termed resource block assignment (RBA). Note, that the number of RBs on which a user is allocated can be dynamic;

Carrier indicator, which is used if a control channel transmitted on a first carrier assigns resources that concern a second carrier, i.e., resources on a second carrier or resources related to a second carrier; (cross carrier scheduling);

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g., an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields. The different DCI formats that are currently defined for LTE are as follows and described in detail in 3GPP TS 36.212, "Multiplexing and channel coding", section 5.3.3.1 (current version v12.2.0 available at http://www.3gpp.org and incorporated herein by reference). In addition, for further information regarding the DCI formats and the particular information that is transmitted in the DCI, please refer to the mentioned technical standard or to LTE—The UMTS Long Term Evolution—From Theory to Practice, Edited by Stefanie Sesia, Issam Toufik, Matthew Baker, Chapter 9.3, incorporated herein by reference.

Format 0: DCI Format 0 is used for the transmission of resource grants for the PUSCH, using single-antenna port transmissions in uplink transmission mode 1 or 2.

Format 1: DCI Format 1 is used for the transmission of resource assignments for single codeword PDSCH transmissions (downlink transmission modes 1, 2 and 7).

Format 1A: DCI Format 1A is used for compact signaling of resource assignments for single codeword PDSCH transmissions, and for allocating a dedicated preamble signature to a mobile terminal for contention-free random access (for all transmissions modes).

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When format 1C is used, the PDSCH transmission is constrained to using QPSK modulation. This is used, for example, for signaling paging messages and broadcast system information messages.

Format 1D: DCI Format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignments for PDSCH for closed-loop MIMO operation (transmission mode 4).

Format 2A: DCI Format 2A is used for the transmission of resource assignments for PDSCH for open-loop MIMO operation. The information transmitted is the same as for Format 2, except that if the eNodeB has two transmit antenna ports, there is no precoding information, and for four antenna ports two bits are used to indicate the transmission rank (transmission mode 3).

Format 2B: Introduced in Release 9 and is used for the transmission of resource assignments for PDSCH for dual-layer beamforming (transmission mode 8).

Format 2C: Introduced in Release 10 and is used for the transmission of resource assignments for PDSCH for closed-loop single-user or multi-user MIMO operation with up to 8 layers (transmission mode 9).

Format 2D: introduced in Release 11 and used for up to 8 layer transmissions; mainly used for COMP (Cooperative Multipoint) (transmission mode 10).

Format 3 and 3A: DCI formats 3 and 3A are used for the transmission of power control commands for PUCCH and PUSCH with 2-bit or 1-bit power adjustments respectively. These DCI formats contain individual power control commands for a group of UEs.

Format 4: DCI format 4 is used for the scheduling of the PUSCH, using closed-loop spatial multiplexing transmissions in uplink transmission mode 2.

The following table gives an overview of some available DCI formats and the typical number of bits, assuming for illustration purposes a system bandwidth of 50 RBs and four antennas at the eNodeB, especially without cross-carrier scheduling or carrier aggregation. The number of bits indicated in the right column include the bits for the CRC of the particular DCI.

| DCI format | Purpose | Number of bits including CRC |
|---|---|---|
| 0 | PUSCH grants | 43 |
| 1 | PDSCH assignments with a single codeword | 47 |
| 1A | PDSCH assignments using a compact format | 43 |
| 1B | PDSCH assignments for rank-1 transmission | 46 |
| 1C | PDSCH assignments using a very compact format | 29 |
| 1D | PDSCH assignments for multi-user MIMO | 46 |
| 2 | PDSCH assignments for closed-loop MIMO operation | 62 |
| 2A | PDSCH assignments for open-loop MIMO operation | 58 |
| 2B | PDSCH assignments for dual-layer beamforming | 57 |
| 2C | PDSCH assignments for closed-loop single-user or multiuser MIMO operation | 58 |
| 2D | PDSCH assignments for closed-loop single-user or multi-user MIMO operation, COMP | 61 |
| 3 | Transmit Power Control (TPC) commands for multiple users for PUCCH and PUSCH with 2-bit power adjustments | 43 |
| 3A | Transmit Power Control (TPC) commands for multiple users for PUCCH and PUSCH with 1-bit power adjustments | 43 |
| 4 | PUSCH grants | 52 |

Additional formats may be defined in the future.

It should be noted that the size is generally a function of the system bandwidth, and that the resource allocation information may occupy a substantial part of the DCI payload.

FIG. 7 illustrates the processing structure for one DCI, according to 3GPP TS 36.212 FIG. 5.3.3-1, as follows:
Information element multiplexing (refers to the multiplexing of the particular information elements making up the one DCI);
CRC attachment;
Channel coding; and
Rate matching.

In order that the UE can identify whether it has received a PDCCH transmission correctly, error detection is provided by means of a 16-bit CRC appended to each PDCCH (i.e., DCI). Furthermore, it is necessary that the UE can identify which PDCCH(s) are intended for it. This could in theory be achieved by adding an identifier to the PDCCH payload; however, it turns out to be more efficient to scramble the CRC with the "UE identity", which saves the additional overhead. The CRC may be calculated and scrambled as defined in detail by 3GPP in TS 36.212, Section 5.3.3.2 "CRC attachment", describing how error detection is provided on DCI transmissions through a Cyclic Redundancy Check (CRC). In summary, the entire payload is used to calculate the CRC parity bits, which are then attached. In case UE transmit antenna selection is not configured or applicable, after attachment, the CRC parity bits are scrambled with the corresponding RNTI. Correspondingly, the UE descrambles the CRC by applying the "UE identity" and, if no CRC error is detected, the UE determines that the PDCCH carries control information intended for itself. The terminology of "masking" and "de-masking" is used as well, for the above-described process of scrambling a CRC with an identity.

Further details in said respect are omitted herewith although the relevant passages are incorporated hereby by reference from TS 36.212, Section 5.3.3.2.

In the following an overview of the particular content of the various DCI Formats is given, according to 3GPP TS 36.212 (current version 12.2.0) as of subclause 5.3.3.1 which details are incorporated herein by reference.

DCI Format 0: Carrier Indicator, Flag for format 0/format 1A differentiation, Frequency Hopping Flag, Resource Block Assignment and hopping resource allocation, Modulation and Coding Scheme and Redundancy Version, New Data indicator, TPC Command for scheduled PUSCH, Cyclic Shift for DM RS and OCC index, UL index, Downlink Assignment Index (DAI), CSI request, SRS request, Resource Allocation Type DCI Format 1: Carrier Indicator, Resource allocation header, Resource Block Assignment, Modulation and Coding scheme, HARQ process number, New Data Indicator, Redundancy Version, TPC command for PUCCH, Downlink Assignment Index, HARQ-ACK resource offset DCI Format 1A: Carrier Indicator, Flag for format 0/format 1A differentiation, localized/distributed VRB assignment flag, Resource Block Assignment, Modulation and Coding Scheme, HARQ process number, New Data Indicator, Redundancy Version, TPC command for PUCCH, Downlink Assignment Index, SRS request, HARQ-ACK resource offset DCI format 1B: Carrier Indicator, localized/distributed VRB assignment flag, Resource Block Assignment, Modulation and Coding Scheme, HARQ process number, New Data Indicator, Redundancy Version, TPC command for PUCCH, Downlink Assignment Index, TPMI information for pre-coding, PMI confirmation for pre-coding, HARQ-ACK resource offset DCI Format 1C: gap value, Resource Block Assignment, Modulation and Coding Scheme, information for MCCH change notification, UL/DL configuration indication, UL/DL configuration number DCI Format 1D: Carrier Indicator, localized/distributed VRB assignment flag, Resource Block Assignment, Modulation and Coding Scheme, HARQ process number, New Data Indicator, Redundancy Version, TPC command for PUCCH, Downlink Assignment Index, TPMI information for pre-coding, Downlink power offset, HARQ-ACK resource offset DCI Format 2: Carrier Indicator, Resource allocation header, Resource Block Assignment, TPC command for PUCCH, Downlink Assignment Index, HARQ process number, Transport Block to codeword swap flag, respectively Modulation and Coding Scheme, New Data Indicator, and Redundancy Version for transport block 1 and 2, Pre-coding information, HARQ-ACK resource offset DCI Format 2A: Carrier Indicator, Resource allocation header, Resource Block Assignment, TPC command for PUCCH, Downlink Assignment Index, HARQ process number, Transport Block to codeword swap flag, respectively Modulation and Coding Scheme, New Data Indicator, and Redundancy Version for transport block 1 and 2, Pre-coding information, HARQ-ACK resource offset DCI Format 2B: Carrier Indicator, Resource allocation header, Resource Block Assignment, TPC command for PUCCH, Downlink Assignment Index, HARQ process number, Scrambling Identity, SRS request, respectively Modulation and Coding Scheme, New Data Indicator, and Redundancy Version for transport block 1 and 2, HARQ-ACK resource offset DCI Format 2C: Carrier Indicator, Resource allocation header, Resource Block Assignment, TPC command for PUCCH, Downlink Assignment Index, HARQ process number, Antenna port(s), scrambling identity and number of layers, SRS request, respectively Modulation and Coding Scheme, New Data Indicator, and Redundancy Version for transport block 1 and 2, HARQ-ACK resource offset DCI Format 2D: Carrier Indicator, Resource allocation header, Resource Block Assignment, TPC command for PUCCH, Downlink Assignment Index, HARQ process number, Antenna port(s), scrambling identity and number of layers, SRS request, respectively Modulation and Coding Scheme, New Data Indicator, and Redundancy Version for transport block 1 and 2, PDSCH RE Mapping and Quasi-Co-Location Indicator, HARQ-ACK resource offset DCI Format 3: TPC command number DCI Format 3A: TPC command number DCI Format 4: Carrier Indicator, Resource Block assignment, TPC command for scheduled PUSCH, Cyclic shift for DM RS and OCC index, UL index, Downlink Assignment Index (DAI), CSI request, SRS request, Resource allocation type, respectively Modulation and Coding Scheme, Redundancy Version, and New Data Indicator for transport blocks 1 and 2, Precoding information and number of layers It may be noted that not all elements listed above are always present; the presence of some of the elements may be configurable, e.g., by RRC parameters. More details regarding the DCI formats and the different fields of the DCI content mentioned above can be found in TS 36.212 v12.2.0 incorporated herein by reference.

Physical Downlink Control Channel (PDCCH)

As already explained, a PDCCH carries messages as DCIs, i.e., DCI messages. Each PDCCH is transmitted on an aggregation of one or more so called Control Channel Elements (CCEs), where each CCE corresponds to nine Resource Element Groups (REGs, i.e., sets of four physical resource elements). REGs constituting CCEs are not consecutive, and CCEs are distributed in frequency over entire bandwidth. Note that CCEs are spread in the frequency domain to achieve frequency diversity. Four PDCCH formats are supported as listed in the following table, which also shows the corresponding possible CCE aggregation levels.

| PDDCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are numbered and used consecutively, and to simplify the decoding process, a PDCCH with a format consisting of n CCEs may only start with a CCE with a number equal to a multiple of n.

The number of available CCEs in a cell varies; it may be semi-static (System bandwidth, PHICH configuration) or dynamic (PCFICH).

The number of CCEs used for transmission of a particular PDCCH is determined by the eNodeB according to channel conditions. For example, if the PDCCH is intended for a mobile terminal with a good downlink channel (e.g., close to the eNodeB), then one CCE is likely to be sufficient. However, for a mobile terminal with a poor channel (e.g., near the cell border), eight CCEs may be required in order to achieve sufficient robustness. In addition, the power level of a PDCCH may be adjusted to match the channel conditions.

It should be noted that for EPDCCH, the basic units for transmission are called ECCE and EREG, respectively. The corresponding numerology and transmission is different from the PDCCH, and can be further looked up especially in 3GPP TS 36.211 incorporated herein by reference.

In detecting a PDCCH, the mobile terminal shall monitor a set of PDCCH candidates for control information in every non-DRX subframe, where monitoring refers to the process of attempting to decode each of PDCCHs in the set according to all DCI formats, as will be explained in more detail later; the term "blind decoding" is also used in said respect.

Blind Decoding of PDCCHs at the User Equipment

In 3GPP LTE (Release 8/9), the user equipment attempts to detect DCI(s) within the PDCCH using so-called "blind decoding". This means that there is no associated control signaling that would indicate the CCE aggregation size or modulation and coding scheme for the PDCCHs signaled in the downlink, but the user equipment tests for all possible combinations of CCE aggregation sizes and modulation and coding schemes, and confirms the successful decoding of a PDCCH based on the RNTI. To further limit complexity a common and dedicated search space in the control signaling region of the LTE component carrier is defined in which the user equipment searches for PDCCHs, i.e., performs the blind decoding.

The Physical Control Format Indicator Channel (PCFICH) carries a Control Format Indicator (CFI) which indicates the number of OFDM symbols used for transmission of control channel information in each subframe. The eNodeB is capable of transmitting multiple PDCCHs in a subframe. The transmissions are organized such that a UE can locate the PDCCHs intended for it, while at the same time making efficient use of the resources allocated for PDCCH transmissions.

A simple approach, at least for the eNodeB, would be to allow the eNodeB to place any PDCCH anywhere in the PDCCH resources (or CCEs) indicated by the PCFICH. In this case, the UE would need to check all possible PDCCH locations, PDCCH formats and DCI formats, and act on those messages with correct CRCs (taking into account that the CRC is scrambled with a UE identity). Carrying out such a blind decoding of all the possible combinations would require the UE to make many PDDCH decoding attempts in every subframe. For small system bandwidths the computational load might be reasonable, but for large system bandwidths with a large number of possible PDCCH locations, it would become a significant burden, leading to excessive power consumption in the UE receiver.

The alternative approach adopted for LTE is to define for each UE a limited set of CCE locations where a PDCCH may be placed. Such a constraint may lead to some limitations as to which UEs can be sent PDCCHs within the same subframe, which would thus restrict the UEs to which the eNodeB could grant resources. Therefore, it is important for good system performance that the set of possible PDCCHs locations available for each UE is not too small. The set of CCE locations in which the UE may find its PDCCHs can be considered as a search space. In LTE the search space is of different size for each PDCCH (DCI) format. Moreover, separate dedicated and common search spaces are defined, where a dedicated (also termed UE-specific) search space is configured for each UE individually, while all UEs are informed of the extent of the common search space. Note that the dedicated and common search spaces may overlap for a given UE. Up to Release 12, the common search space is only supported on PDCCH, while the dedicated search space is supported on PDCCH as well as on EPDCCH.

With small search spaces it is quite possible in a given subframe that the eNodeB cannot find CCE resources to send PDCCHs to all the UEs that it would like to, because, having assigned some CCE locations, the remaining CCE locations are not in the search space of a particular UE. To minimize the possibility of such a blocking persisting into the next subframe, a UE-specific hopping sequence (derived from the UE identity) is applied to the starting positions of the UE-specific search spaces from subframe to subframe.

The starting location of the UE specific search space on PDCCH is usually determined by a hashing function based, e.g., on the slot number within the radio frame, the RNTI value and other parameters. The UE specific search space allows aggregation levels of 1, 2, 4 and 8 CCEs. On EPDCCH, the location is more configurable, and the EPDCCH supports aggregation levels beyond 8.

Further information is provided in LTE—The UMTS Long Term Evolution—From Theory to Practice, Edited by Stefanie Sesia, Issam Toufik, Matthew Baker, Chapter 9.3, incorporated herein by reference.

Resource Allocation Types

Conveying indications of physical layer resource allocation is one of the major functions of the PDCCHs. While the exact use of the PDCCHs depends on the other algorithms implemented in the eNodeB, it is nevertheless possible to outline some general principles of typical operation. In each subframe, PDCCHs indicate the frequency domain resource allocations. Resource allocations are normally localized, meaning that a physical resource block (PRB) in the first half of a subframe is paired with the PRB at the same frequency in the second half of the subframe.

The main design challenge for the signaling of frequency domain resource allocations is to find a good compromise between flexibility and signaling overhead. The most flexible, and arguably the simplest, approach is to send each UE a bitmap in which each bit indicates a particular PRB. This would work well for small system bandwidths, but for large system bandwidths (i.e., up to 110 PRBs) the bitmap would need 110 bits, which would be a prohibitive overhead— particularly for small packets, where the PDCCH message could be larger than the data packet. One possible solution would be to send a combined resource allocation message to all UEs, but this was rejected on the grounds of the high power needed to reach all UEs reliably, including those at the cell edges. The approaches adopted in the LTE are as follows. Different resource allocation types 0, 1, and 2 are defined with different characteristics.

Resource allocation Type 0: In resource allocations of Type 0, a bitmap indicates the resource block groups (RBGs) which are allocated to the scheduled UE, where an RBG is a set of consecutive PRBs. The RBG size is a function of the system bandwidth; i.e., with an increased downlink bandwidth the RBG size increases non-linearly.

Resource allocation Type 1: In resource allocations of Type 1, individual PRBs can be addressed, but only within a subset of the PRBs available in the component carrier or cell. The bitmap used is slightly smaller than for Type 0, since some bits are used to indicate which subset of the RBG is addressed, and a shift in the position of the bitmap. The total number of bits (including the use of additional flags) is the same as for Type 0. The motivation for providing this method of resource allocation is flexibility in spreading the resources across the frequency domain to exploit the frequency diversity.

Resource allocation Type 2: In resource allocations of Type 2, the resource allocation information indicates a contiguous set of Virtual Resource Blocks, VRBs, using either localized or distributed mapping to PRBs as indicated by a 1-bit flag in the resource allocation message. PRB allocations may vary from a single PRB up to a maximum number of PRBs spanning the system bandwidth. A Type 2 resource allocation field consists of a resource indication value (MV) corresponding to a starting RB ($RB_{START}$) and a length in terms of contiguously allocated RBs ($L_{CRBs}$)

More specific information on the different resource allocation types can be found in TS 36.213, clause 7.1.6 "Resource Allocation" (current version 12.3.0) incorporated herein by reference.

It may be noted that the size of the resource block information in the various DCI formats is a function of the resource allocation type, as well as of the system bandwidth. For the example of 6-110 PRB, the following table shows how many bits are required for the corresponding downlink resource allocation type.

|  | 6 PRB | 15 PRB | 25 PRB | 50 PRB | 75 PRB | 100 PRB | 110 PRB |
|---|---|---|---|---|---|---|---|
| Resource allocation Type 0, 1 | 6 | 8 | 13 | 17 | 19 | 25 | 28 |
| Resource allocation Type 2 | 5 | 7 | 9 | 11 | 12 | 13 | 13 |

Additionally, uplink resource allocation types 0 and 1 are supported for PDCCH/EPDCCH with uplink DCI format. More specific information on the different resource allocation types for uplink can be found in TS 36.213, clause 8.1 "Resource allocation for PDCCH/EPDCCH with uplink DCI format" (current version 12.3.0) incorporated herein by reference.

Transmission Modes for the PDSCH (Physical Downlink Shared Channel)

The Physical Downlink Shared CHannel (PDSCH) is the main data bearing downlink channel in LTE. It is used for all user data, as well as for broadcast system information which is not carried on the PBCH, and for paging messages—there is no specific physical layer paging channel in LTE. Data is transmitted on the PDSCH in units known as Transport Blocks (TBs), each of which corresponds to a Medium Access Control (MAC) layer protocol data unit (PDU). Transport blocks may be passed down from the MAC layer to the physical layer once per Transmission Time Interval (TTI), where a TTI is one ms, corresponding to the subframe duration.

When employed for user data, one or, at most, two transport blocks can be transmitted per UE per subframe per component carrier, depending on the transmission mode selected for the PDSCH for each UE. In LTE, usually there are multiple antenna for downlink, i.e., the eNodeB may use multiple transmit antenna, and the UE may use multiple receiving antenna. The two antenna can be used in diverse configurations, which are distinguished and denoted as transmission modes in LTE. The UE is configured by the eNodeB with a particular transmission mode. For instance, the single transmission antenna in single receiver antenna mode is called transmission mode 1. The various transmission modes are defined in the 3GPP technical standard TS 36.213 (current version 12.3.0), subclause 8.0 for the uplink (particularly Tables 8-3, 8-3A, 8-5, 8-5A) and subclause 7.1 for the downlink (particularly Tables 7.1-1, 7.1-2, 7.1-3, 7.1-5, 7.1-5A, 7.1-6, 7.1-6A, 7.1-7); these re incorporated herein by reference. These tables from 3GPP TS 36.13 show the relationship between RNTI Type (e.g., C-RNTI, SPS C-RNTI, SI-RNTI), the Transmission Mode and the DCI format.

In the following, Tables 7.1-5, 7.1-5A, 7.1-6, and 7.1-6A of TS 36.213 are shown.

TABLE 7.1-5

PDCCH and PDSCH configured by C-RNTI

| Transmission mode | DCI format | Search Space | Transmission scheme of PDSCH corresponding to PDCCH |
|---|---|---|---|
| Mode 1 | DCI format 1A | Common and UE-specific by C-RNTI | Single-antenna port, port 0 (see subclause 7.1.1) |
| | DCI format 1 | UE-specific by C-RNTI | Single-antenna port, port 0 (see subclause 7.1.1) |
| Mode 2 | DCI format 1A | Common and UE-specific by C-RNTI | Transmit diversity (see subclause 7.1.2) |
| | DCI format 1 | UE-specific by C-RNTI | Transmit diversity (see subclause 7.1.2) |
| Mode 3 | DCI format 1A | Common and UE-specific by C-RNTI | Transmit diversity (see subclause 7.1.2) |
| | DCI format 2A | UE-specific by C-RNTI | Large delay CDD (see subclause 7.1.3) or Transmit diversity (see subclause 7.1.2) |
| Mode 4 | DCI format 1A | Common and UE-specific by C-RNTI | Transmit diversity (see subclause 7.1.2) |
| | DCI format 2 | UE-specific by C-RNTI | Closed-loop spatial multiplexing (see subclause 7.1.4) or Transmit diversity (see subclause 7.1.2) |
| Mode 5 | DCI format 1A | Common and UE-specific by C-RNTI | Transmit diversity (see subclause 7.1.2) |
| | DCI format 1D | UE-specific by C-RNTI | Multi-user MIMO (see subclause 7.1.5) |
| Mode 6 | DCI format 1A | Common and UE-specific by C-RNTI | Transmit diversity (see subclause 7.1.2) |
| | DCI format 1B | UE-specific by C-RNTI | Closed-loop spatial multiplexing (see subclause 7.1.4) using a single transmission layer |

TABLE 7.1-5-continued

PDCCH and PDSCH configured by C-RNTI

| Transmission mode | DCI format | Search Space | Transmission scheme of PDSCH corresponding to PDCCH |
|---|---|---|---|
| Mode 7 | DCI format 1A | Common and UE-specific by C-RNTI | If the number of PBCH antenna ports is one, Single-antenna port, port 0 is used (see subclause 7.1.1), otherwise Transmit diversity (see subclause 7.1.2) |
| | DCI format 1 | UE-specific by C-RNTI | Single-antenna port, port 5 (see subclause 7.1.1) |
| Mode 8 | DCI format 1A | Common and UE-specific by C-RNTI | If the number of PBCH antenna ports is one, Single-antenna port, port 0 is used (see subclause 7.1.1), otherwise Transmit diversity (see subclause 7.1.2) |
| | DCI format 2B | UE-specific by C-RNTI | Dual layer transmission, port 7 and 8 (see subclause 7.1.5A) or single-antenna port, port 7 or 8 (see subclause 7.1.1) |
| Mode 9 | DCI format 1A | Common and UE-specific by C-RNTI | Non-MBSFN subframe: If the number of PBCH antenna ports is one, Single-antenna port, port 0 is used (see subclause 7.1.1), otherwise Transmit diversity (see subclause 7.1.2) MBSFN subframe: Single-antenna port, port 7 (see subclause 7.1.1) |
| | DCI format 2C | UE-specific by C-RNTI | Up to 8 layer transmission, ports 7-14 (see subclause 7.1.5B) or single-antenna port, port 7 or 8 (see subclause 7.1.1) |
| Mode 10 | DCI format 1A | Common and UE-specific by C-RNTI | Non-MBSFN subframe: If the number of PBCH antenna ports is one, Single-antenna port, port 0 is used (see subclause 7.1.1), otherwise Transmit diversity (see subclause 7.1.2) MBSFN subframe: Single-antenna port, port 7 (see subclause 7.1.1) |
| | DCI format 2D | UE-specific by C-RNTI | Up to 8 layer transmission, ports 7-14 (see subclause 7.1.5B) or single-antenna port, port 7 or 8 (see subclause 7.1.1) |

TABLE 7.1-5A

EPDCCH and PDSCH configured by C-RNTI

| Transmission mode | DCI format | Search Space | Transmission scheme of PDSCH corresponding to EPDCCH |
|---|---|---|---|
| Mode 1 | DCI format 1A | UE specific by C-RNTI | Single-antenna port, port 0 (see subclause 7.1.1) |
| | DCI format 1 | UE specific by C-RNTI | Single-antenna port, port 0 (see subclause 7.1.1) |
| Mode 2 | DCI format 1A | UE specific by C-RNTI | Transmit diversity (see subclause 7.1.2) |
| | DCI format 1 | UE specific by C-RNTI | Transmit diversity (see subclause 7.1.2) |
| Mode 3 | DCI format 1A | UE specific by C-RNTI | Transmit diversity (see subclause 7.1.2) |
| | DCI format 2A | UE specific by C-RNTI | Large delay CDD (see subclause 7.1.3) or Transmit diversity (see subclause 7.1.2) |

TABLE 7.1-5A-continued

EPDCCH and PDSCH configured by C-RNTI

| Transmission mode | DCI format | Search Space | Transmission scheme of PDSCH corresponding to EPDCCH |
|---|---|---|---|
| Mode 4 | DCI format 1A | UE specific by C-RNTI | Transmit diversity (see subclause 7.1.2) |
| | DCI format 2 | UE specific by C-RNTI | Closed-loop spatial multiplexing (see subclause 7.1.4) or Transmit diversity (see subclause 7.1.2) |
| Mode 5 | DCI format 1A | UE specific by C-RNTI | Transmit diversity (see subclause 7.1.2) |
| | DCI format 1D | UE specific by C-RNTI | Multi-user MIMO (see subclause 7.1.5) |
| Mode 6 | DCI format 1A | UE specific by C-RNTI | Transmit diversity (see subclause 7.1.2) |
| | DCI format 1B | UE specific by C-RNTI | Closed-loop spatial multiplexing (see subclause 7.1.4) using a single transmission layer |
| Mode 7 | DCI format 1A | UE specific by C-RNTI | If the number of PBCH antenna ports is one, Single-antenna port, port 0 is used (see subclause 7.1.1), otherwise Transmit diversity (see subclause 7.1.2) |
| | DCI format 1 | UE specific by C-RNTI | Single-antenna port, port 5 (see subclause 7.1.1) |
| Mode 8 | DCI format 1A | UE specific by C-RNTI | If the number of PBCH antenna ports is one, Single-antenna port, port 0 is used (see subclause 7.1.1), otherwise Transmit diversity (see subclause 7.1.2) |
| | DCI format 2B | UE specific by C-RNTI | Dual layer transmission, port 7 and 8 (see subclause 7.1.5A) or single-antenna port, port 7 or 8 (see subclause 7.1.1) |
| Mode 9 | DCI format 1A | UE specific by C-RNTI | Non-MBSFN subframe: If the number of PBCH antenna ports is one, Single-antenna port, port 0 is used (see subclause 7.1.1), otherwise Transmit diversity (see subclause 7.1.2) MBSFN subframe: Single-antenna port, port 7 (see subclause 7.1.1) |
| | DCI format 2C | UE specific by C-RNTI | Up to 8 layer transmission, ports 7-14 (see subclause 7.1.5B) or single-antenna port, port 7 or 8 (see subclause 7.1.1) |
| Mode 10 | DCI format 1A | UE specific by C-RNTI | Non-MBSFN subframe: If the number of PBCH antenna ports is one, Single-antenna port, port 0 is used (see subclause 7.1.1), otherwise Transmit diversity (see subclause 7.1.2) MBSFN subframe: Single-antenna port, port 7 (see subclause 7.1.1) |
| | DCI format 2D | UE specific by C-RNTI | Up to 8 layer transmission, ports 7-14 (see subclause 7.1.5B) or single-antenna port, port 7 or 8 (see subclause 7.1.1) |

TABLE 7.1-6

PDCCH and PDSCH configured by SPS C-RNTI

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
| | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
| | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
| | DCI format 2A | UE specific by C-RNTI | Transmit diversity (see subclause 7.1.2) |
| Mode 4 | DCI format 1A | Common and UE specific by C-RNTI | Transmit diversity (see subclause 7.1.2) |
| | DCI format 2 | UE specific by C-RNTI | Transmit diversity (see subclause 7.1.2) |
| Mode 5 | DCI format 1A | Common and UE specific by C-RNTI | Transmit diversity (see subclause 7.1.2) |
| Mode 6 | DCI format 1A | Common and UE specific by C-RNTI | Transmit diversity (see subclause 7.1.2) |
| Mode 7 | DCI format 1A | Common and UE specific by C-RNTI | Single-antenna port, port 5 (see subclause 7.1.1) |
| | DCI format 1 | UE specific by C-RNTI | Single-antenna port, port 5 (see subclause 7.1.1) |
| Mode 8 | DCI format 1A | Common and UE specific by C-RNTI | Single-antenna port, port 7 (see subclause 7.1.1) |
| | DCI format 2B | UE specific by C-RNTI | Single-antenna port, port 7 or 8 (see subclause 7.1.1) |
| Mode 9 | DCI format 1A | Common and UE specific by C-RNTI | Single-antenna port, port 7 (see subclause 7.1.1) |
| | DCI format 2C | UE specific by C-RNTI | Single-antenna port, port 7 or 8, (see subclause 7.1.1) |
| Mode 10 | DCI format 1A | Common and UE specific by C-RNTI | Single-antenna port, port 7 (see subclause 7.1.1) |
| | DCI format 2D | UE specific by C-RNTI | Single-antenna port, port 7 or 8, (see subclause 7.1.1) |

TABLE 7.1-6A

EPDCCH and PDSCH configured by SPS C-RNTI

| Transmission mode | DCI format | Search Space | Transmission scheme of PDSCH corresponding to EPDCCH |
|---|---|---|---|
| Mode 1 | DCI format 1A | UE specific by C-RNTI | Single-antenna port, port 0 (see subclause 7.1.1) |
| | DCI format 1 | UE specific by C-RNTI | Single-antenna port, port 0 (see subclause 7.1.1) |
| Mode 2 | DCI format 1A | UE specific by C-RNTI | Transmit diversity (see subclause 7.1.2) |
| | DCI format 1 | UE specific by C-RNTI | Transmit diversity (see subclause 7.1.2) |

TABLE 7.1-6A-continued

EPDCCH and PDSCH configured by SPS C-RNTI

| Transmission mode | DCI format | Search Space | Transmission scheme of PDSCH corresponding to EPDCCH |
|---|---|---|---|
| Mode 3 | DCI format 1A | UE specific by C-RNTI | Transmit diversity (see subclause 7.1.2) |
| | DCI format 2A | UE specific by C-RNTI | Transmit diversity (see subclause 7.1.2) |
| Mode 4 | DCI format 1A | UE specific by C-RNTI | Transmit diversity (see subclause 7.1.2) |
| | DCI format 2 | UE specific by C-RNTI | Transmit diversity (see subclause 7.1.2) |
| Mode 5 | DCI format 1A | UE specific by C-RNTI | Transmit diversity (see subclause 7.1.2) |
| Mode 6 | DCI format 1A | UE specific by C-RNTI | Transmit diversity (see subclause 7.1.2) |
| Mode 7 | DCI format 1A | UE specific by C-RNTI | Single-antenna port, port 5 (see subclause 7.1.1) |
| | DCI format 1 | UE specific by C-RNTI | Single-antenna port, port 5 (see subclause 7.1.1) |
| Mode 8 | DCI format 1A | UE specific by C-RNTI | Single-antenna port, port 7 (see subclause 7.1.1) |
| | DCI format 2B | UE specific by C-RNTI | Single-antenna port, port 7 or 8 (see subclause 7.1.1) |
| Mode 9 | DCI format 1A | UE specific by C-RNTI | Single-antenna port, port 7 (see subclause 7.1.1) |
| | DCI format 2C | UE specific by C-RNTI | Single-antenna port, port 7 or 8, (see subclause 7.1.1) |
| Mode 10 | DCI format 1A | UE specific by C-RNTI | Single-antenna port, port 7 (see subclause 7.1.1) |
| | DCI format 2D | UE specific by C-RNTI | Single-antenna port, port 7 or 8, (see subclause 7.1.1) |

These depicted tables provide several predefined transmission modes identifying the particular transmission scheme to be used for the PDSCH corresponding to the (E)PDCCH.

In order to keep the computational load arising from the total number of blind decoding attempts under control, the UE is not required to search for all the defined DCI formats simultaneously. For example, in the common search space the UE will search for DCI Formats 0, 1A, and 1C. In addition, the UE may be configured to search for Format 3 or 3A, which have the same size as DCI formats 0 and 1A, and may be distinguished by having the CRC scrambled by a different (common) identity (e.g., TPC-PUCCH-RNTI, Transmit Power Control-Physical Uplink Control Channel-RNTI, or TPC-PUSCH-RNTI, Transmit Power Control-Physical Uplink Shared Channel-RNTI), rather than a UE-specific one (e.g., C-RNTI).

Typically, in the UE-dedicated search space, the UE will always search for DCI formats 0 and 1A, which are both the same size and are distinguished by a flag in the DCI message. In addition, a UE may be required to receive further DCI formats (e.g., 1, 1B or 2) depending on the PDSCH transmission mode configured by the eNodeB. The above tables additionally define for the UE which DCI formats are to be attempted to be decoded (i.e., blind decoded) in the corresponding search spaces (e.g., common, UE-specific, PDCCH, ePDCCH, depending on configuration) masked by a certain RNTI. For instance, a UE configured by the eNodeB to be in Transmission Mode 3, shall—according to the above four tables—monitor, e.g., DCI format 1A, and DCI format 2A in the common and UE-specific search spaces of the PDCCH or the UE-specific search space of the EPDCCH with a CRC masking by C-RNTI and SPS C-RNTI. By only having to blind decode those DCI formats associated with the particular configured transmission mode, the blind decoding effort is kept at a reasonable amount.

The specifications further define a plurality of CCE/ECCE aggregation levels, for each of which generally a plurality of candidates per DCI format are blindly decoded. It may be noted that the number of blind decoding candidates in the UE-specific search space for carrier aggregation up to Release 12 increases linearly with the number of configured/activated component carriers for a UE.

LTE on Unlicensed Bands—Licensed-Assisted Access LAA

In September 2014, 3GPP initiated a new study item on LTE operation on unlicensed spectrum. The reason for extending LTE to unlicensed bands is the ever-growing demand for wireless broadband data in conjunction with the limited amount of licensed bands. Unlicensed spectrum therefore is more and more considered by cellular operators as a complementary tool to augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum due to the inevitable coexistence with other radio access technologies (RATs) in the unlicensed spectrum. LTE operation on unlicensed bands will therefore at least in the beginning be considered rather a complement to LTE on licensed spectrum than stand-alone operation on unlicensed spectrum. Based on this assumption, 3GPP established the term Licensed Assisted Access (LAA) for the LTE operation on unlicensed bands in conjunction with at least one licensed band. Future stand-alone operation of LTE on unlicensed spectrum without relying on LAA however shall not be excluded.

The current intended general LAA approach at 3GPP is to make use of the already specified Rel-12 carrier aggregation (CA) framework as much as possible where the CA framework configuration comprises a so-called primary cell (PCell) carrier and one or more secondary cell (SCell) carriers. CA supports in general both self-scheduling of cells (scheduling information and user data are transmitted on the same component carrier) and cross-carrier scheduling between cells (scheduling information in terms of PDCCH/EPDCCH and user data in terms of PDSCH/PUSCH are transmitted on different component carriers).

A very basic scenario is illustrated in FIG. 8, with a licensed PCell, licensed SCell 1, and various unlicensed SCells 2, 3, 4 (exemplarily depicted as small cells). The transmission/reception network nodes of unlicensed SCells 2, 3, 4 could be remote radio heads managed by the eNB, or could be nodes that are attached to the network but not managed by the eNB. For simplicity, the connection of these nodes to the eNB or to the network is not explicitly shown in the figure.

At present, the basic approach envisioned at 3GPP is that the PCell will be operated on a licensed band while one or more SCells will be operated on unlicensed bands. The benefit of this strategy is that the PCell can be used for reliable transmission of control messages and user data with high quality of service (QoS) demands, such as for example voice and video, while a PCell on unlicensed spectrum might yield, depending on the scenario, to some extent significant QoS reduction due to inevitable coexistence with other RATs.

It has been agreed during RAN1#78bis, that the LAA investigation at 3GPP will focus on unlicensed bands at 5 GHz, although no final decision is taken. One of the most critical issues is therefore the coexistence with Wi-Fi (IEEE 802.11) systems operating at these unlicensed bands. In order to support fair coexistence between LTE and other technologies such as Wi-Fi as well as fairness between different LTE operators in the same unlicensed band, the channel access of LTE for unlicensed bands has to abide by certain sets of regulatory rules which depend on region and considered frequency band; a comprehensive description of the regulatory requirements for operation on unlicensed bands at 5 GHz is given in R1-144348, "Regulatory Requirements for Unlicensed Spectrum", Alcatel-Lucent et al., RAN1#78bis, September 2014 incorporate herein by reference. Depending on region and band, regulatory requirements that have to be taken into account when designing LAA procedures comprise Dynamic Frequency Selection (DFS), Transmit Power Control (TPC), Listen Before Talk (LBT) and discontinuous transmission with limited maximum transmission duration. The intention of the 3GPP is to target a single global framework for LAA which basically means that all requirements for different regions and bands at 5 GHz have to be taken into account for the system design.

DFS is required for certain regions and bands in order to detect interference from radar systems and to avoid co-channel operation with these systems. The intention is furthermore to achieve a near-uniform loading of the spectrum. The DFS operation and corresponding requirements are associated with a master-slave principle. The master shall detect radar interference, can however rely on another device, that is associated with the master, to implement the radar detection.

The operation on unlicensed bands at 5 GHz is in most regions limited to rather low transmit power levels compared to the operation on licensed bands resulting in small coverage areas. Even if the licensed and unlicensed carriers were to be transmitted with identical power, usually the unlicensed carrier in the 5 GHz band would be expected to support a smaller coverage area than a licensed cell in the 2 GHz band due to increased path loss and shadowing effects for the signal. A further requirement for certain regions and bands is the use of TPC in order to reduce the average level of interference caused to other devices operating on the same unlicensed band.

Following the European regulation regarding LBT, devices have to perform a Clear Channel Assessment (CCA) before occupying the radio channel. It is only allowed to initiate a transmission on the unlicensed channel after detecting the channel as free based on energy detection. The equipment has to observe the channel for a certain minimum during the CCA. The channel is considered occupied if the detected energy level exceeds a configured CCA threshold. If the channel is classified as free, the equipment is allowed to transmit immediately. The maximum transmit duration is thereby restricted in order to facilitate fair resource sharing with other devices operating on the same band.

Considering the different regulatory requirements, it is apparent that the LTE specification for operation on unlicensed bands will require several changes compared to the current Rel-12 specification that is limited to licensed band operation.

In connection with the new work item Licensed-Assisted Access it is also not finally decided how the mobile nodes are assigned with resources for uplink and downlink communication. A reliable and efficient resource assignment should be implemented taking into account the special circumstances of unlicensed carriers.

BRIEF SUMMARY

One non-limiting and exemplary embodiment provides an improved method for allocating radio resources to a user terminal in a communication system.

The independent claims provide non-limiting and exemplary embodiments. Advantageous embodiments are subject to the dependent claims.

According to a first aspect, first predetermined radio resources are configured for the user terminal, which may be used for uplink/downlink communication between the user terminal and the radio control entity—particularly on an unlicensed carrier (although they may be used also for a licensed carrier), as will be explained in the following. These predetermined radio resources are associated with a particular format of a DCI message. Consequently, the radio control entity by transmitting a DCI message with this particular format to the user terminal can allocate these predetermined radio resources to the user terminal. Put differently, the user terminal when successfully decoding this DCI message of the particular format, identifies the first predetermined radio resources associated therewith, and uses same for communication with the radio control entity (via the unlicensed carrier).

One advantage is that, by using predetermined radio resources known both in the user terminal and the radio control entity, the DCI message of the particular format (i.e., the resource allocation message) does not have to explicitly include bits for indicating radio resources to be allocated; put differently, while the predetermined radio resources are preconfigured, the actual resource allocation of same is simply performed by transmitting the DCI message of the particular format itself (provided the DCI message is correctly decoded by the user terminal). Thus, the amount of bits transmitted over the radio interface is reduced.

Furthermore, since no resource allocation is comprised in the DCI message of the particular format, the size of the DCI message of the particular format is independent from a bandwidth of the unlicensed carrier, which resources are to be allocated to the user terminal. Therefore, the size of the DCI message of the particular format does not change, allowing cross-carrier scheduling from any search space regardless of the actual bandwidth and thus increasing flexibility for the DCI transmission, as generally fewer resources are required for a corresponding DCI transmission, which reduces the risk of blocking or collisions in the (E)PDCCH resources.

Different implementations of this first aspect differ, e.g., as to how the DCI message of the particular format is transmitted to the user terminal, for example via the unlicensed carrier, or via another carrier (unlicensed or licensed (e.g., PCell or SCell)).

Still further implementations of this first aspect focus on the actual content (i.e., the fields) of the particular format of the DCI message, e.g., for uplink or downlink resource allocation, the necessary/optional fields of the DCI format. This may vary strongly between different implementations.

Then again, other implementations of the first aspect differ as to the particular definition of the predetermined radio resources. For instance, the predetermined radio resources could refer to all the resource blocks within one or a plurality of subframes; i.e., the complete bandwidth of the carrier would be allocated to the user terminal being triggered on by the reception of the DCI message of the particular format. Alternatively, the predetermined radio resources could refer to only a part of all the resource blocks within one or a plurality of subframes, such as the upper, lower, or center half of the bandwidth.

In addition, other implementations of the first aspect differ as to how the predetermined radio resources for the unlicensed carrier are actually configured, for example by higher layer signaling, and/or radio resource control, RRC, messages. It is important to point out in this connection that these predetermined radio resources should be defined in the user terminal and the radio control entity before the actual resource allocation takes place.

In further specific implementations of the first aspect there may be several predetermined radio resources defined for the user terminal (e.g., those four already mentioned above), in which case one of those several predetermined resources has to be selected, either well before the resource allocation takes place (e.g., by configuration when the unlicensed carrier is set up, or after set up during, e.g., an RRC reconfiguration procedure at least for said carrier) or alternatively based on the received DCI message of the particular format (e.g., by use of a corresponding small field in the DCI message content). This increases the flexibility of the radio resource allocation controlled by the radio control entity (and frequency selectivity); albeit at the cost of additional bit(s) (but still far less than the bits used for a normal resource allocation field).

In further specific implementations of the first aspect the particular format of the DCI message is associated with transmission modes, which define which formats of DCI messages are to be blind decoded, such that the blind decoding effort is not increased at all or is only increased a little.

Correspondingly, in one general aspect, the techniques disclosed here feature a user terminal for performing communication with a radio control entity in a communication system, wherein at least first predetermined radio resources are configured in the user terminal for use in connection with a particular carrier and are associated with a particular format of a downlink control information, DCI, message. A receiving unit of the user terminal receives a DCI message of the particular format from the radio control entity. A processor of the user terminal identifies the first predetermined radio resources associated with this received DCI message, and upon receiving the DCI message of the particular format, and uses the identified first predetermined radio resources for communication between the user terminal and the radio control entity via the particular carrier. The particular carrier can be an unlicensed carrier Correspondingly, in one general aspect, the techniques disclosed here feature a radio control entity for allocating radio resources to a user terminal for performing communication between the radio control entity and the user terminal in a communication system, wherein at least first predetermined radio resources are configured in the user terminal and the radio control entity for use in connection with a particular carrier and are associated with a particular format of a downlink control information, DCI, message. A transmitter of the radio control entity transmits a DCI message of the particular format to the user terminal. The DCI message of the particular format, is such that the user terminal, upon receiving the DCI message of the particular format, identifies the first predetermined radio resources associated with this received DCI message, and uses the identified first predetermined radio resources for communication with the radio control entity via the particular carrier. A transceiver unit of the radio control entity performs communication with the user terminal using the first predetermined radio resources associated with the previously-transmitted DCI message of the particular format on the particular carrier. The particular carrier can be an unlicensed carrier.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE SEVERAL VIEWS OF THE DRAWINGS

In the following exemplary embodiments are described in more detail with reference to the attached figures and drawings.

FIG. 7 illustrates the processing of a DCI message, including the CRC attachment, channel coding, and rate matching, FIG. 8 illustrates an exemplary licensed-assisted access scenario, with various licensed and unlicensed cells, FIG. 9 illustrates cross-carrier scheduling based on a DCI message transmitted on the PCell, for allocating resources of the PDSCH in an SCell.

DETAILED DESCRIPTION

Figure 1:
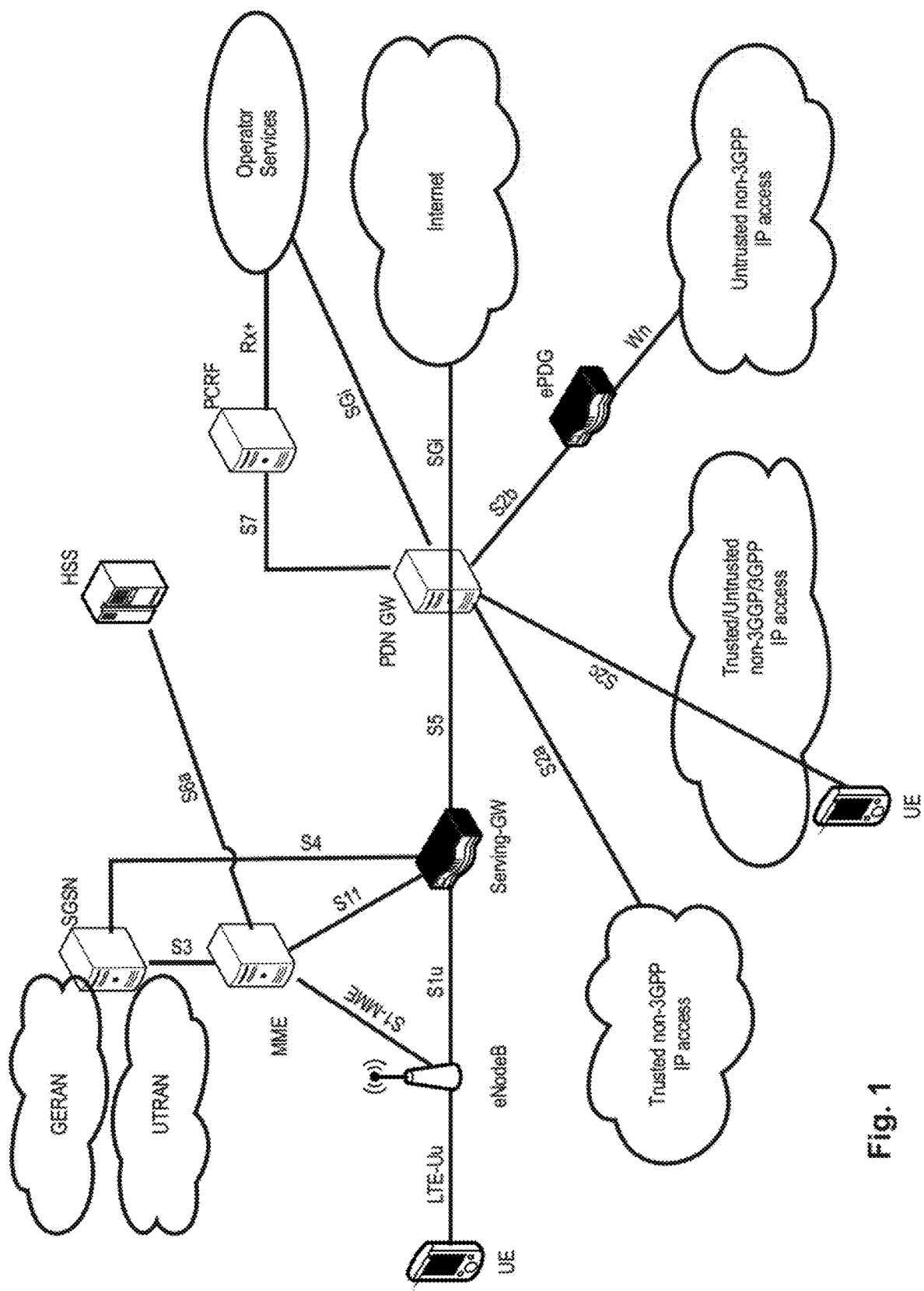
FIG. 1 shows an exemplary architecture of a 3GPP LTE system.
Figure 2:
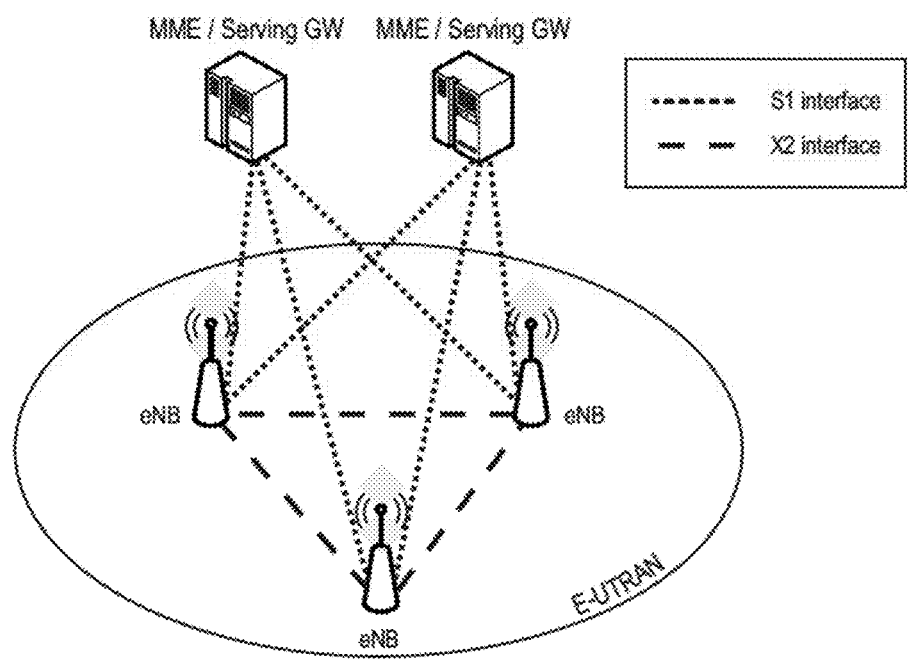
FIG. 2 shows an exemplary overview of the overall E-UTRAN architecture of 3GPP LTE.
Figure 3:
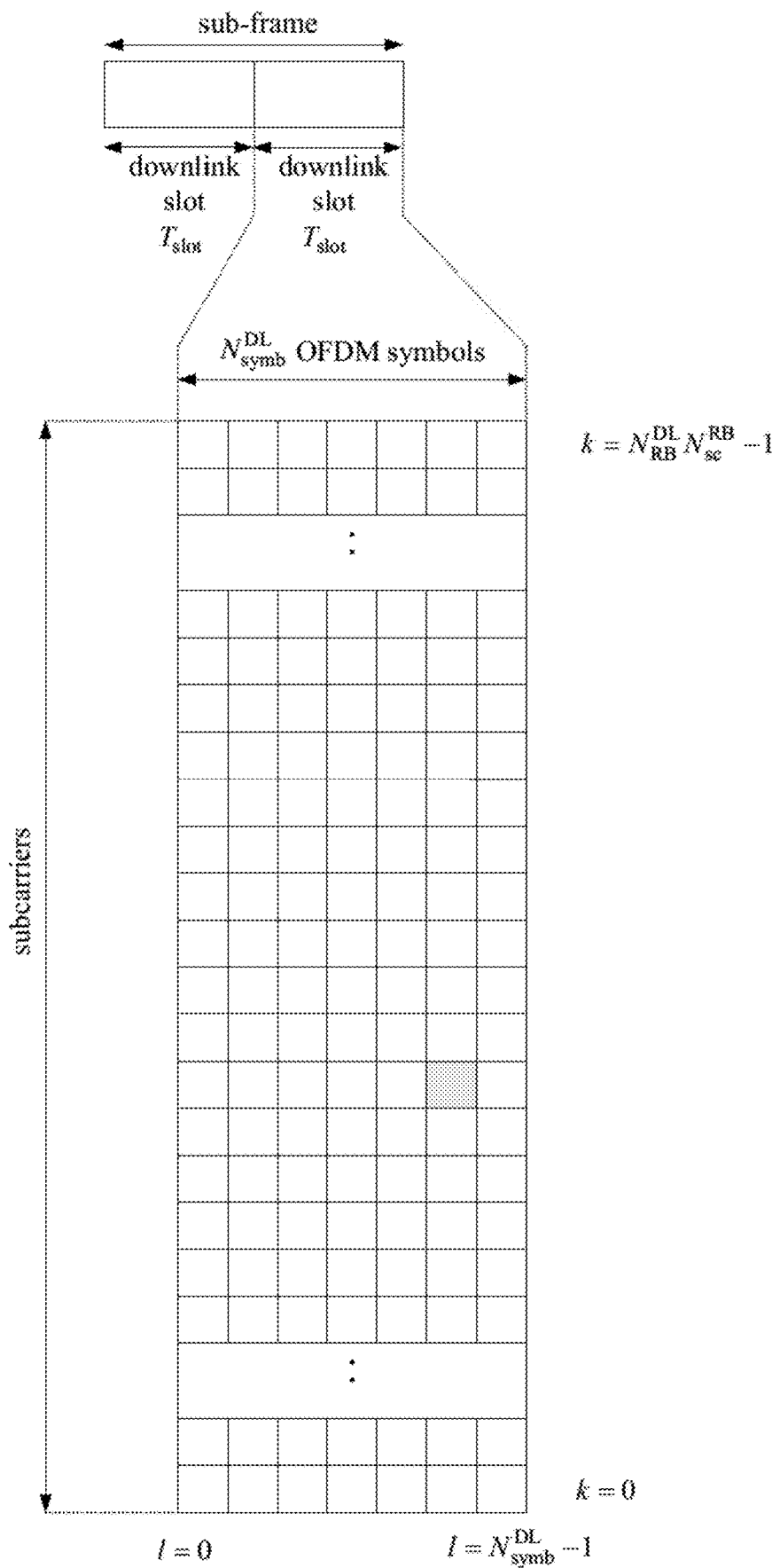
FIG. 3 shows exemplary subframe boundaries on a downlink component carrier as defined for 3GPP LTE (Release 8/9)
Figure 4:
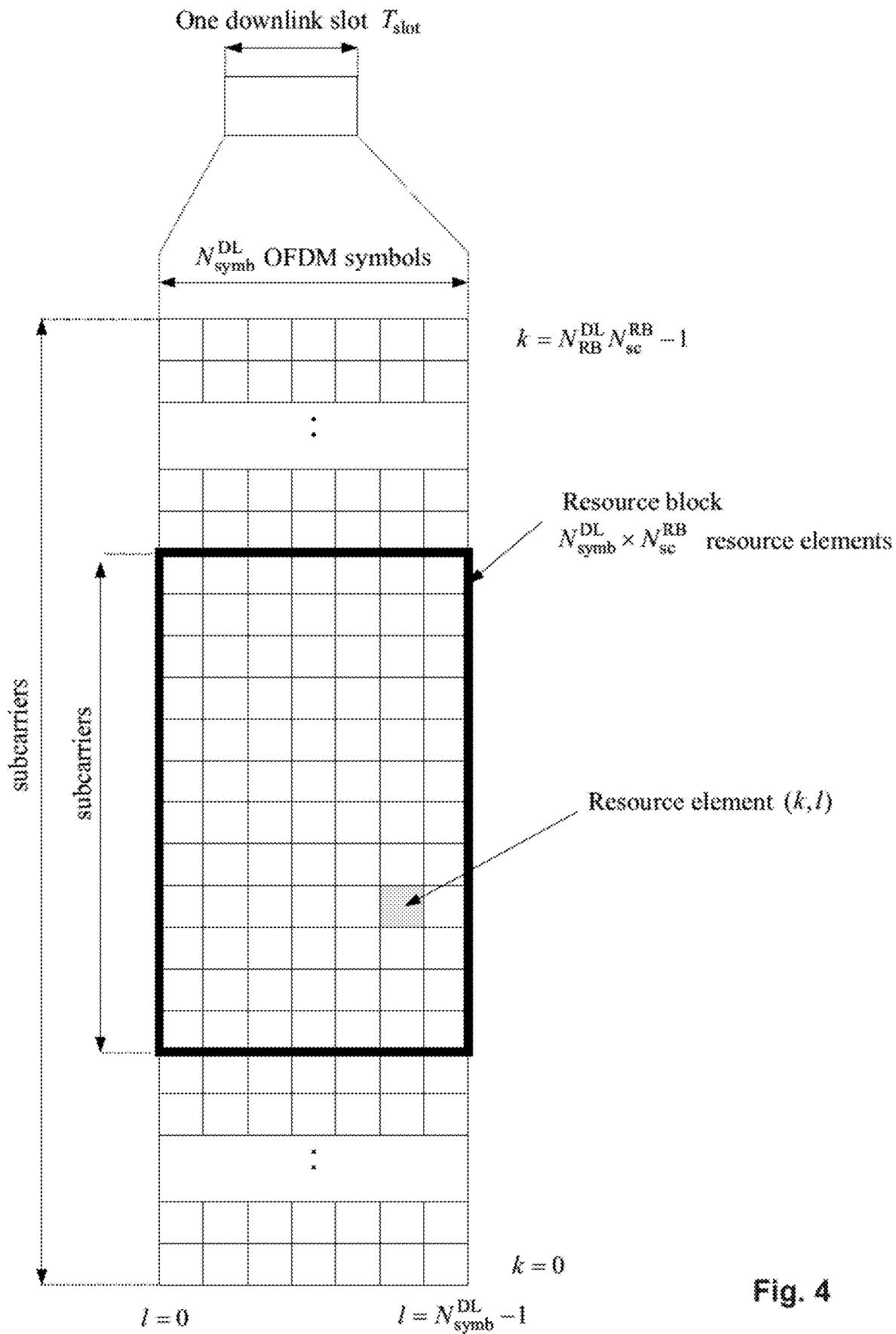
FIG. 4 shows an exemplary downlink resource grid of a downlink slot as defined for 3GPP LTE (Release 8/9)
Figure 5:
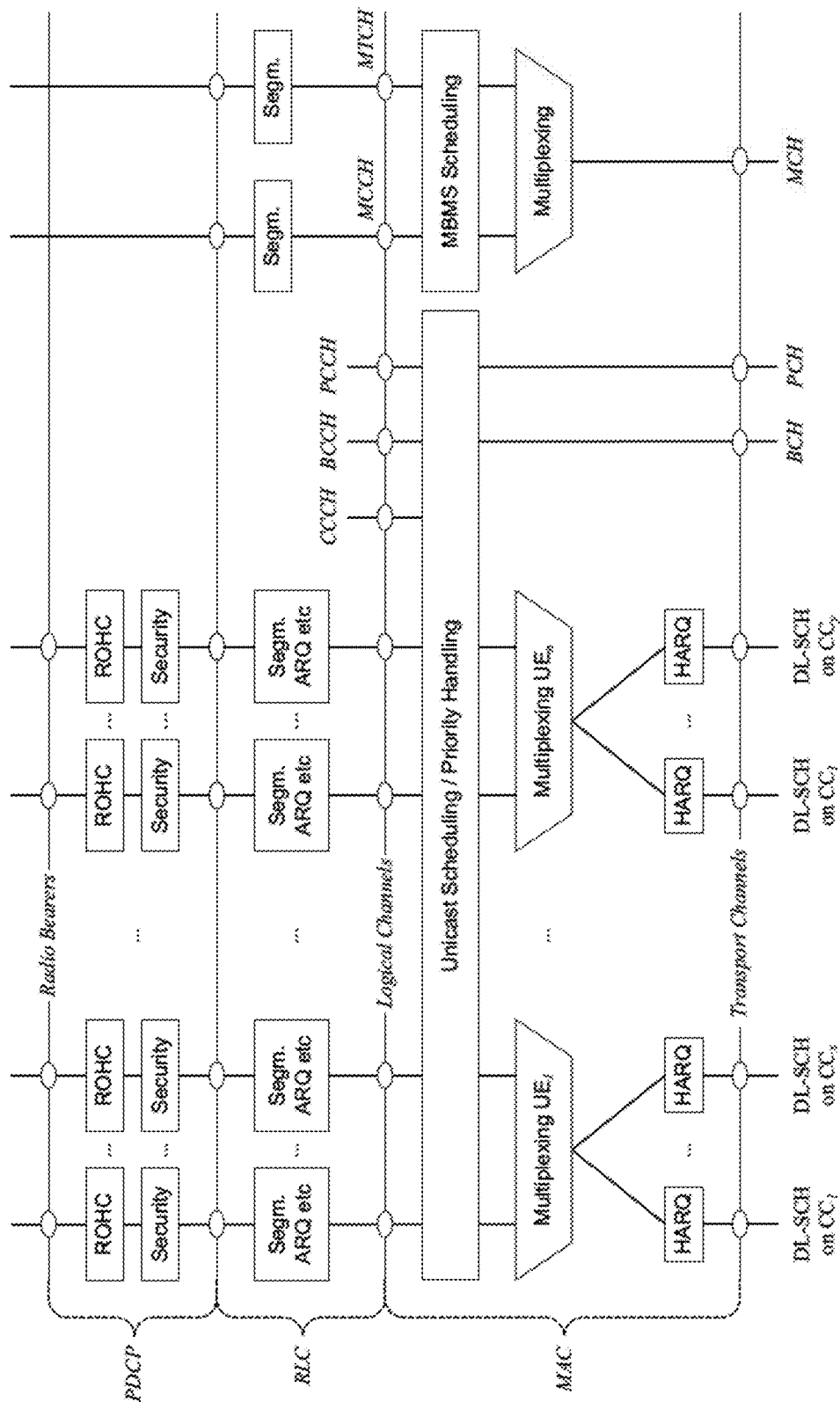
FIGS. 5 & 6 show the 3GPP LTE-A (Release 10) Layer 2 structure with activated carrier aggregation for the downlink and uplink, respectively.
Figure 6:
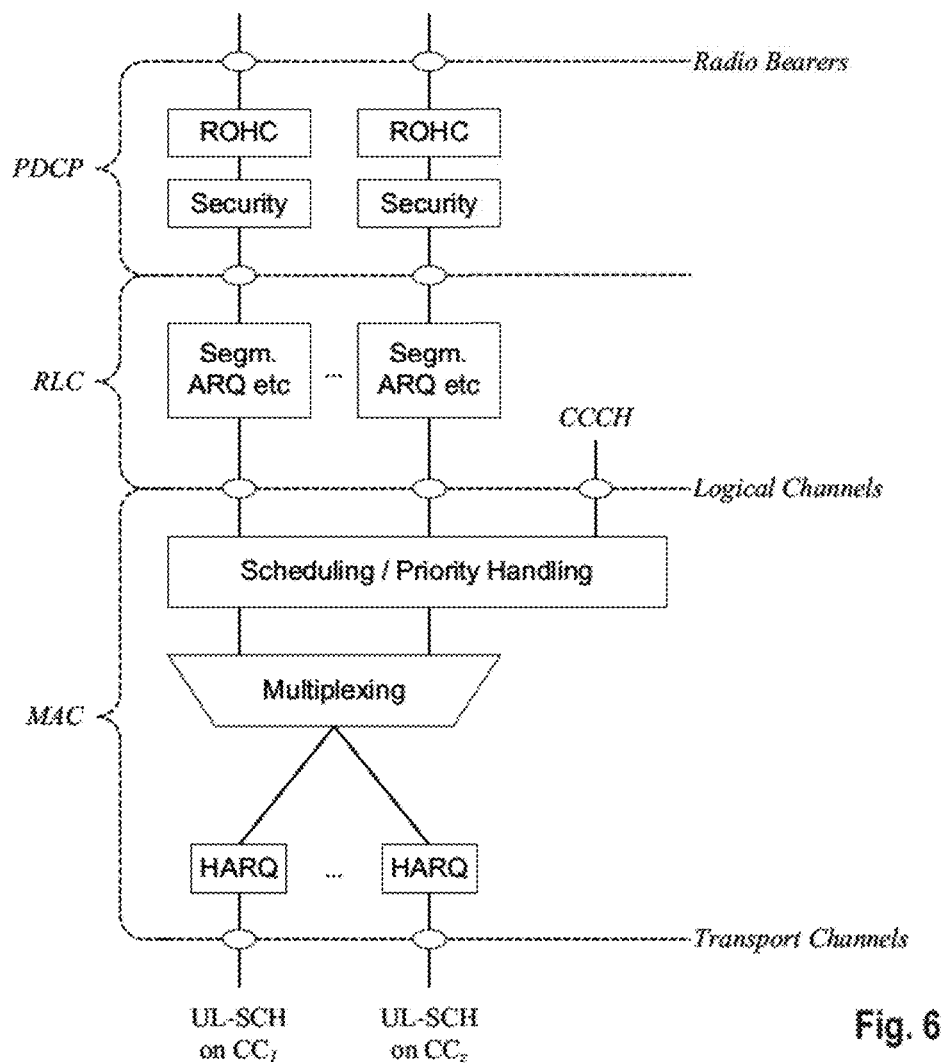

It should be noted that the embodiments may be advantageously used for example in a mobile communication system such as 3GPP LTE-A (Release 10/11/12) communication systems as described in the Technical Background section above, but the embodiments are not limited to its use in this particular exemplary communication networks.

A mobile station or mobile node or user terminal is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

The term "radio resources" as used in the set of claims and in the application is to be broadly understood as referring to physical radio resources, such as time-frequency resources.

The term "preconfigured", or "predetermined" as used in the set of claims and in the application in connection with radio resources is to be broadly understood in that the corresponding radio resources are known to the user terminals before the actual resource allocation of said predetermined radio resources takes place, e.g., from the very beginning, or when adding a secondary unlicensed cell through corresponding configuration information.

The term "unlicensed carrier", and conversely "licensed carrier" are to be understood in connection with the new LTE work item licensed-assisted access (LAA). Correspondingly, "licensed carriers" is the term for the usual carriers used up to now for LTE, whereas "unlicensed carriers" would be the term used for additional carrier(s) which cover(s) frequencies which are at the moment not licensed for LTE. As described in the background section there are several differences between licensed carriers and unlicensed carriers, as regards, e.g., reliability, power level and QoS.

The term "higher layer signaling" as used in the set of claims and in the application is to be understood broadly referring to layers above the PHY layer (according to the OSI model), comprising the MAC layer (e.g., MAC CE), RRC layer, and further layers above, and their corresponding signals and messages.

As explained in the background section, it is not finally decided how resource scheduling by the radio control entity is implemented, i.e., how the user terminals are assigned resources for uplink and downlink communication. One option of course is to apply the resource scheduling of LTE for licensed carriers as well to the unlicensed carriers. However, unlicensed carrier access is rather limited and unreliable. For instance, unlicensed carrier access may be limited to for example at most 10 ms of continuous usage in Europe, and for example to 4 ms of continuous usage in Japan, which makes continuous, i.e., non-interfered, PDCCH (or CRS) transmission on the unlicensed carrier difficult. By using the concept of cross-carrier scheduling, one solution could be to transmit the resource assignment for the unlicensed carrier via a licensed carrier (such as PCell or SCell of the user terminal), which allows for a continuous and reliable transmission of the resource assignment. The resource allocation messages (DCI messages) would include a corresponding "carrier indicator field" enabling cross-carrier scheduling of the unlicensed carrier.

FIG. 9 illustrates a conventional cross carrier scheduling mechanism, where the DCI message transmitted on the PDCCH of the PCell, provides a frequency-selective resource assignment using the RBA field in the detected DCI message. FIG. 9 assumes an exemplary resource allocation according to downlink resource allocation type 0, where each bit of the RBA represents a resource block group (RBG); see also background section above for more details.

The use of the conventional cross carrier scheduling however has drawbacks. For instance, the DCI for two transport block resource assignments with cross carrier scheduling is typically around 67-71 bit (including CRC). As a result, for a reliable quality/coverage, the aggregation level 1 is usually not sufficient (coding rate >0,9), and a higher aggregation level is needed thus increasing the number of PDCCH resources necessary for transmitting the resource allocation message.

The following exemplary embodiments are conceived by the inventors to mitigate the problems explained and to provide a reliable and efficient resource allocation concept, particularly for unlicensed carriers (although it is equally applicable to licensed carriers).

In the following, several exemplary embodiments will be explained in detail. Some of these are supposed to be implemented in the wide specification as given by the 3GPP standards and explained partly in the present background section, with the particular key features as explained in the following pertaining to the various embodiments. It should be noted that the embodiments may be advantageously used for example in a mobile communication system such as 3GPP LTE-A (Release 10/11/12) communication systems as described in the Technical Background section above, but the embodiments are not limited to its use in this particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. Correspondingly, the following scenarios assumed for explanatory purposes of the various embodiments shall not limit the disclosure as such.

In the following a set of embodiments will be explained. To simplify the illustration of the underlying principles, several assumptions are made; however, it should be noted that these assumptions should not be interpreted as limiting the scope of the present application, as broadly defined by the claims.

According to a first aspect, an improved resource allocation method is provided so as to allocate radio resources to a user terminal. For the great part of the following description of this first aspect, it is assumed that the resource allocation is performed for allocating resources of an unlicensed carrier. However, the improved resource allocation method is equally applicable for allocating radio resources of a licensed carrier.

A main idea of the first aspect is to configure predetermined radio resources for the user terminal and the radio control entity to be later used for radio resource scheduling in connection with an unlicensed (and/or licensed) carrier. In particular, information on the predetermined radio resources is configured in advance in the user terminal such that the actual resource allocation taking place later can refer thereto. Further details on the actual radio resources will be discussed later.

In addition, these predetermined radio resources are associated with a particular format of a downlink control information, DCI, message, allowing the user terminal, upon receiving a DCI message of this particular format, to make the association and identify these predetermined radio resources. Therefore, radio resource allocation is controlled by the radio control entity by transmitting a DCI message of this particular format to the user terminal for a particular licensed or unlicensed carrier. In turn, the user terminal receiving this DCI message from the radio control entity, identifies the predetermined radio resources associated with this format of the DCI message as well as the carrier for which it is intended, and uses the same for communication with the radio control entity via the intended (unlicensed or licensed) carrier.

Whether the predetermined radio resources are used in the uplink or downlink is not specified by the predetermined radio resources themselves, but rather depends on the DCI message transmitted from the radio control entity to the user terminal. The format of the DCI message may be a format for downlink communication or for uplink communication; the user terminal accordingly uses the predetermined radio resources associated with the DCI message of the particular format to perform an uplink communication or to receive downlink data transmitted from the radio control entity. Alternatively, there could be predetermined uplink radio resources and, independently, predetermined downlink radio resources, which might be realized by different higher layer signal information elements. Accordingly, upon successful detection of a DCI format for uplink communication, the user terminal uses the predetermined uplink radio resources associated with the DCI message of the particular format to perform an uplink communication, or, upon successful detection of a DCI format for downlink communication, the user terminal uses the predetermined downlink radio resources associated with the DCI message of the particular format to receive downlink data from the radio control entity.

Figure 10:
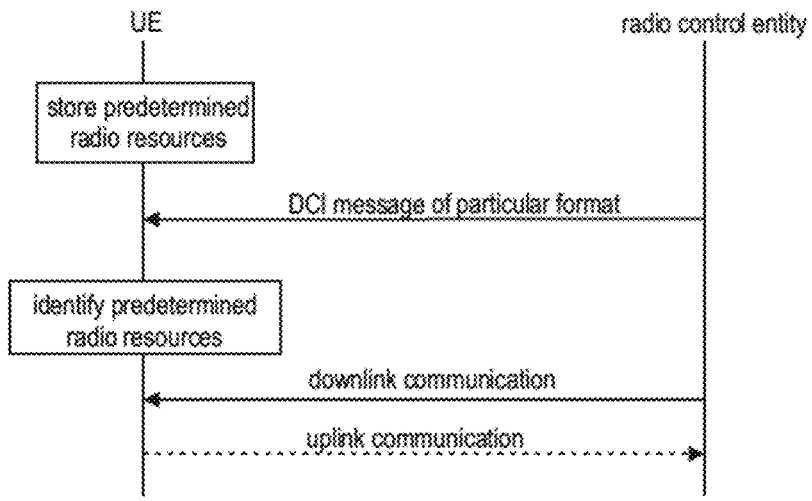
FIG. 10 is a signaling diagram illustrating the message exchange between a user terminal and a radio control entity according to the first aspect.

The above described functioning of the first aspect is illustrated in FIG. 10, being a signaling diagram illustrating the message exchange between the user terminal and the radio control entity, where the radio control entity is also assumed to be the data transmission/reception entity. In the particular example illustrated in FIG. 10 it is assumed that the particular format of the DCI message is for downlink communication; the alternative is illustrated in FIG. 10 with a dashed arrow.

Several advantages are connected with this first aspect as will be explained in the following. Foremost, by defining predetermined radio resources, it is not necessary that the content of the DCI message explicitly indicates such radio resources. Put differently, no bits need to be provided in the DCI message for explicitly identifying the radio resources that are to be allocated since such resources are already predetermined and are known to both the user terminal and the radio control entity. The successful decoding of the DCI message as such in the user terminal is to be understood as the scheduling assignment, while the radio resources which are (to be) allocated are not defined within the DCI message but rather according to predetermined information stored/configured in advance in the user terminal (and the radio control entity). In contrast, resource allocation messages according to the prior art include a resource allocation information field with several bits to identify the actual resources that are allocated (e.g., ~25 bits). Consequently, the amount of bits of the scheduling message (DCI message) is greatly reduced.

In prior art systems, DCI messages as used for resource allocation provide a corresponding resource allocation field which size is dependent on the bandwidth of the carrier to which the resource allocation refers. In contrast thereto, the size of DCI messages of the particular format are independent of the bandwidth of the carrier to which the resource allocation refers, since the information on the (predetermined) radio resources is already preconfigured in the user terminal. The number of blind decoding candidates increases with the number of component carriers; however, each set of candidates is defined by the targeted component carrier, and therefore the size of each candidate depends on the bandwidth of the carrier to which the candidate refers. Consequently, each candidate in a first set of candidates for a first carrier may generally have a first size, while a second set of candidates for a second carrier may have a second size that is different from the first size. Therefore, it is not possible to assign resources for the second carrier via the candidates of the first set and vice versa. An equal size of the candidates in the first and second candidate sets however enables such an assignment. The candidate sets are also termed search space; therefore, an equal size of candidates in multiple search spaces, such as facilitated by DCI messages of which the size does not depend on the bandwidth of the carrier to which the resource allocation refers, allows cross-carrier scheduling from any such search space regardless of the actual target carrier bandwidth, i.e., thus increasing the flexibility for the DCI transmission by allowing said transmission on any such search space.

The use of the improved resource allocation method, which is based on configuring predetermined radio resources in the user terminal and in the radio control entity, is particularly advantageous in connection with unlicensed carriers. One advantage of not using predetermined radio resources, but allowing the radio control entity to flexibly allocate radio resources via a corresponding radio allocation field in the radio allocation message, is that the allocated radio resources can be adapted to the link, i.e., channel state information previously received from the user terminal regarding a particular carrier can be used by the radio control entity to improve scheduling of radio resources by selecting those radio resources with the best channel state (frequency-selective resource allocation). While this may be valid to some extent for licensed carriers, for unlicensed carriers the transmission of cell specific reference signals (CRS) and also the transmission of the channel state information from the user terminal to the radio control entity may be rather unreliable and discontinuous; e.g., in view of possible contention issues with other radio access technologies like Wi-Fi. Consequently, for an unlicensed carrier, frequency-selective link adaptation may not be very accurate due to the missing/obsolete/inaccurate CSI feedback from the user terminal. Therefore, the possible disadvantage of losing the frequency-selective allocation capability is not very crucial for unlicensed carriers. Rather, due to the special circumstances in connection with unlicensed carriers, the use of predetermined radio resources and particularly the advantages already described above may compensate for this disadvantage.

While the above explains the basic concept and advantages behind the first aspect, the following description provides more specific implementations of various side aspects.

As explained above, the radio control entity transmits the resource allocation message (DCI message) to the user terminal to allocate the predetermined radio resources for use by the user terminal. The DCI message can be transmitted via the unlicensed carrier itself (i.e., the unlicensed carrier for which the radio resource allocation is intended). Alternatively, the DCI message can be transmitted to the user terminal via another carrier, be it another unlicensed carrier or a licensed carrier such as the PCell or a licensed SCell of the user terminal. In the latter case where a different carrier is used to transmit the resource allocation message, the user terminal must learn to which carrier the resource allocation actually refers, which can be for instance done by the content of the DCI message which may include the corresponding carrier identification.

As explained above, predetermined radio resources are configured for the user terminal to be used later to execute a particular resource allocation. In prior art systems, radio resources are identified according to different resource allocation types (see particularly uplink and downlink resource allocation types 0, 1, 2 as standardized for LTE and discussed in the background section), meaning that the radio resources are stored in the user terminal and the radio control entity in a particular format. Similarly, the predetermined radio resources as such could also be defined in different ways. One option is to reuse the resource allocation types defined for 3GPP LTE, in particular one of downlink resource allocation types 0, 1, or 2, or uplink resource allocation types 0, or 1 (although the predetermined radio resources can, but do not have to, be already predetermined for downlink or uplink).

Alternatively, the predetermined radio resources can be also defined in a different format, for example according to a new resource allocation type particularly usable to predetermine such radio resources for use in connection with (un)licensed carriers. This new resource allocation type, and particularly the number of bits that are to be used in said respect, will also depend on the intended flexibility and detail which is desired for defining such predetermined radio resources. For example, according to one exemplary embodiment explained in more detail later, there are four different predetermined radio resources (upper, lower, central or complete band) (for one or several subframes), in which case 2 bits would theoretically suffice to differentiate between those 4 possibilities (disregarding for the moment the possibility of indicating whether the predetermined resources shall apply to one or several subframes). It should be noted that the number of bits is here still independent of the system bandwidth of the carrier.

As already hinted above, a further option is to additionally define whether the predetermined radio resources, once allocated by transmitting the DCI message of the particular format, and successfully decoding the same in the user terminal, shall be applicable for one or several subframes (such as a duration of more than 1 TTI). This would add flexibility to defining the predetermined radio resource allocation, and at the same time eliminate the need for transmitting a further resource allocation message in the next subframe (or still further subframes), in cases where the same resources shall be allocated to the user terminal in subsequent subframes. This is beneficial to keep the overall control message overhead low.

It is assumed here that the resource allocation is to be applied by the user terminal at least in the same subframe in which the DCI message is received, in the case of a downlink assignment. In the case of receiving an uplink DCI message, the resource allocation of the predetermined radio resources shall be applied in at least a subframe that occurs a specified or determined time interval after the subframe in which the DCI message is received according to the conventional timing in case of in the uplink assignment. Specifically, the specified time interval can be a fixed value (such as 1, 2, 3, or 4 subframes), or the determined time interval could be determined from an indication in the DCI message itself.

Furthermore, there is no limitation as to which resource blocks the predetermined radio resources can define. For example, the predetermined radio resources may actually comprise all resource blocks of the unlicensed carrier, i.e., which would effectively allocate the complete band of the unlicensed carrier to one particular user terminal for at least one subframe. On the other hand, the predetermined radio resources may not comprise all of the resource blocks but merely part of same, where any definition of resource blocks is possible. One option for predetermined radio resources can be an upper or lower half of the carrier, i.e., contiguous resource blocks from the center frequency to the upper or lower frequency end of the carrier. Another option is to define predetermined radio resources around the center frequency of the carrier, in total also occupying for example half of the complete carrier bandwidth.

In the above explanation of the first aspect, it has been assumed that the predetermined resources are stored in the user terminal, however without giving any details as to how this can be achieved. There are several possibilities in said respect. One option would be to specify the predetermined radio resources in a corresponding 3GPP standard, such that the predetermined resources are effectively hardcoded in the user terminal and the radio control entity. In this particular case there is only a reduced flexibility. According to another option, higher layers can configure these predetermined radio resources in the user terminal, for instance by using MAC control elements, and/or system information via SIB(s). A still further option would be a radio resource control, RRC, message, possibly transmitted from the radio control entity to the user terminal when establishing the SCell for the unlicensed carrier. Furthermore, a combination of the above-described different options may be possible, such that for instance a default predetermined radio resource is defined by a 3GPP specification, while higher layer signaling and/or RRC signaling may overwrite the default predetermined radio resource definition with a different one, as preferred by network operators for example.

According to further implementations, several different radio resources may be predetermined in the user terminal and radio control entity at the beginning, from which one particular must be selected for the actual radio resource allocation. Possible different predetermined radio resources have already been exemplarily identified above; in one example, four different: the complete bandwidth of a carrier, upper or lower half of the carrier, i.e., contiguous resource blocks from the center frequency to the upper or lower frequency end of the carrier, or predetermined radio resources around the center frequency of the carrier. When considering several different predetermined radio resources being defined, the selection of one of them can be performed in various ways. For instance, the several different radio resources may be predetermined by for example 3GPP specification (as discussed already above), while the selection of one of them can be configured specifically by the network operator (for example may be cell specific) by use of higher layer signaling or dedicated RRC messages destined to the UE. In any case even though several different predetermined radio resources are available, one of them is selected beforehand to be later used for communication upon receiving a corresponding DCI message of the particular format. Another possibility is that one of the several different determined radio resources is selected based on the received DCI message, for example by including corresponding indication in the DCI message identifying which of the available different predetermined radio resources is to be actually allocated by this DCI message; taking the above example with 4 different predetermined radio resources, a 2-bit field in the DCI message would suffice in said respect. It should be noted that the number of bits for the indication is still independent of the system bandwidth of the carrier.

According to further exemplary embodiments, the predetermined resources define a restriction on the overall available resources by a predetermined set of resources (e.g., by higher layer signaling), out of which a resource allocation information field in a DCI could then further down-select. For example, assuming a predetermined radio resource would define the top half of all the physical resource blocks (as already mentioned above), then the resource allocation information in the DCI message could further down-select which of those resources are allocated. This may be particularly accomplished by an RBA field and an existing resource allocation type that assumes the predetermined resource as the available system bandwidth. A benefit is that the RBA field can become considerably smaller than for the full system bandwidth, thereby improving the transmission of the corresponding new DCI format. Alternatively, RBA bits could be saved by supporting a resource allocation type that allows a roll-over, such that an RBA that indicates the starting resource block as #95 and a length of 10 allocated resource blocks in a 100-PRB bandwidth case would effectively assign resource blocks #95 to #99 and #0 to #4 to the UE.

Several different implementations of the first aspect have been described above. In the following, the principles behind the first aspect and its implementations are applied in an exemplary manner to an LTE/LTE-A system (such as the one described in the background section).

As explained in the background section, 3GPP envisages the licensed-assisted access to unlicensed carriers, however fails to provide an approach on how to best assign resources for unlicensed carriers. In this context, the present embodiments provide an efficient resource allocation method, which although primarily intended for use with unlicensed carriers, is actually also applicable for allocation of resources on licensed carriers. Consequently, even though the following (and previous) discussion focused on applying the resource allocation method in connection with the new 3GPP Work Item LAA (i.e., for allocating resources on an unlicensed carrier), the embodiments are not restricted thereto but can be alternatively or additionally be applied for allocating resources on a licensed LTE carrier, and therefore an any LTE carrier/cell. For example, it might be also possible to extend the carrier aggregation mechanism to licensed bands, especially for a scenario of small SCells (i.e., cells with a smaller coverage than, e.g., the PCell); the improved radio resource allocation could thus be applied for licensed carriers in this connection.

In both contexts, the current limit of up to 5 simultaneously configured component carriers could be increased to 8 or even beyond; in the latter case, it may then be necessary to increase the Carrier Indicator Field to more than the currently defined 3 bits. It should therefore be understood that the currently established field sizes should in no way be seen as a limiting factor or prerequisite for the applicability of the current disclosure.

As already explained before, the UE and eNodeB store information on predetermined radio resources, which the eNodeB can refer to when allocating resources of an unlicensed carrier to the user terminal. This information on predetermined radio resources shall be configured in advance, i.e., before the resource allocation takes place, but may for example also be dynamically changed in particular implementations to increase flexibility. This can be done in many different ways, while the particular way is not essential to the functioning of the disclosure as broadly described before, e.g., with reference to FIG. 10.

According to one option, the necessary information on the predetermined radio resources is standardized, i.e., fixed by a suitable 3GPP specification, such as TS 36.213 (PHY procedures), 36.321 (MAC specification) or 36.331 (RRC specification), such that both the UE and the eNodeB know from the very beginning which predetermined radio resources are available for the improved radio resource allocation method of the embodiments. While this option allows to predefine these radio resources without the need of particular messages to be exchanged over the radio interface with the UE, the flexibility and freedom of the network operators to control their cells is rather restricted.

Alternatively or additionally, a different mechanism to predefine radio resources in the UE and eNodeB can be the use of higher layer signaling. Correspondingly, a responsible network entity (e.g., a radio network controller, or an eNB) may decide on the particular radio resources which are to be allowed for such licensed-assisted access in a particular domain/cell, and configures the UE (as well as the eNodeB, if necessary) appropriately. Any of various different protocols can be used to transmit the necessary information to the UE, such as MAC Control Elements, via system information (e.g., via SIB(s) or dedicated RRC messages). This mechanism for preconfiguring radio resources allows some flexibility and freedom for the network operator. For instance, the actual radio resources that are predetermined in the UE can be carefully chosen (and even dynamically adapted if desired) to radio conditions in the cell (i.e., the predetermined radio resources could be cell specific), or even be specific to particular UEs (i.e., UE-specific, with differing predetermined radio resources for different UEs).

Still another possibility to predefine such radio resources in the UE and eNodeB could be dedicated RRC messages, transmitted from the eNodeB to the UE for example when establishing the SCell for the unlicensed carrier or even after the establishment. The dedicated RRC messages can also be used to overwrite previous definitions of the predetermined radio resources in the UE (and eNodeB) and thus to dynamically adapt these predetermined resources as needed; in this sense a predetermined radio resource that is fixed by a specification can be seen as a default predetermined radio resource that can be reconfigured, if so desired.

Independent from the particular mechanism used to predefine such resources in the UE and eNodeB, the UE as well as the eNodeB know in advance about the predetermined radio resources which are available for allocation according to the improved resource allocation method discuss in the various embodiments.

The actual definition of the predetermined radio resources, i.e., which Physical Resource Blocks (PRBs) compose the predetermined radio resources, can also vary a lot. The predetermined resources can be composed of any suitable number and position of PRBs; with the restriction of still being within one carrier. Examples have been already mentioned before, one being that the predetermined resources define the complete bandwidth of a carrier, i.e., such a wideband configuration effectively assigns the full 20 MHz to a single UE (see also FIG. 11 explained in detail later, and also FIG. 12 right hand side, predetermined radio resource Nr. 1). According to another option, less than the full bandwidth is defined for the predetermined radio resources, with numerous different possibilities of which physical resource blocks actually constitute the predetermined radio resources; FIG. 12 right hand side, predetermined radio resources Nr. 2, 3 and 4 show exemplary different radio resources respectively occupying half of the complete bandwidth in total, i.e., 10 MHz. Another example of predetermined radio resources can be the (PDSCH) resources as depicted in FIG. 9, upper half for SCell.

Independent of the actual content of the predetermined radio resources, how this information is stored, i.e., in which format, can also vary. As explained above, different resource allocation types are already provided in 3GPP LTE, in particular downlink resource allocation types 0, 1, and 2, as well as uplink resource allocation types 0 and 1 (details are already provided in the background section). Consequently, a straightforward option would be to reuse those resource allocation types already standardized by 3GPP, in order to define the predetermined radio resources discussed above. Accordingly, when exemplarily assuming a resource allocation type 0 (as used in FIG. 9), predetermined radio resources constituting the complete bandwidth would be represented by the following bits 111 111 111 111; predetermined radio resources constituting the upper half of the bandwidth would be represented by the following bits 111 111 000 000, etc. This applies correspondingly to the other resource allocation types, and a skilled person is readily able to define the predetermined radio resources in the format as required for the respective resource allocation types 0, 1, 2.

Alternatively, it might be beneficial to introduce a new resource allocation type for defining such predetermined radio resources in view of that the resource allocation types 0, 1 and 2 discussed above may involve an excessive number of bits when compared to the flexibility and level of detail necessary/desired for defining such predetermined radio resources. Particularly when considering only very simple predetermined radio resources, such as the complete bandwidth, instead of spending 12 bits as exemplarily shown above, it would be more beneficial to provide a resource allocation type which allows to indicate this with less bits. For example, a downlink resource allocation type 3 (or an uplink resource allocation type 2) could be defined as:

In this resource allocation type, the UE is assigned all physical resource blocks (PRBs) within the system bandwidth.

Such a definition would support the mentioned full bandwidth assignment, which is determined as a function of the successfully decoded DCI format.

In an alternative example, the definition of such a new resource allocation type could be:

In this resource allocations type, the resource block assignment information includes a field for indicating the physical resource blocks (PRBs) that are allocated to the scheduled UE. The field is of size $N_{Field}$ bits, where $2^{N_{Field}}$ is greater or equal to the number of predetermined radio resources that are defined or configured for that UE and/or the target carrier/cell. There is a one-to-one relation between each such predetermined radio resources and the corresponding field value, such that, e.g.,

| Field Value | Resource block assignment |
|---|---|
| '00' | The first predetermined radio resources, e.g., configured by the higher layers |
| '01' | The second predetermined radio resources, e.g., configured by the higher layers |
| '10' | The third predetermined radio resources, e.g., configured by the higher layers |
| '11' | The fourth predetermined radio resources, e.g., configured by the higher layers |

The definition of the predetermined radio resources and the UE and eNodeB can, in addition to the actual PRBs, define the time for which the resources shall be applicable (once their allocation is triggered by receiving the associated DCI message of the particular format). While it may be assumed that a likely configuration would only define one subframe as the time to apply the resources, it may well be advantageous to predefine that once they are allocated, the UE can use these predetermined radio resources for more than one subframe.

When implementing the above-mentioned idea into 3GPP LTE/LTE-A systems, there are also several possibilities as to the particular format of the DCI message associated with the predetermined radio resources, used to trigger the allocation of the predetermined radio resources in the user terminal. In the background section the several available DCI formats according to the current standardization of 3GPP LTE/LTE-A are described in detail. One idea is to introduce new DCI formats for the purpose of allocating these predetermined radio resources according to the improved resource allocation method explained in the various embodiments.

For example a new DCI format, exemplarily termed "2E", may be defined and associated with such predetermined radio resource allocation as explained so far. The DCI formats of the family 2 (i.e., 2, 2A, 2B, 2C, 2D) refer to downlink resource assignments using multiple antenna, and with the possibility of transmitting 1 or 2 transport blocks. The new DCI format 2E, introduced herewith, may be similar to one of those DCI formats, however with the important difference that at least the resource block assignment field is not necessary in the new DCI format 2E, thus saving about 25 bit of the DCI size. Consequently, the new DCI format 2E may be identical to either of the DCI formats 2, 2A, 2B, 2C, 2D, with the mentioned difference of not having fields for the resource allocation (i.e., resource allocation header, and resource block assignment).

The new DCI format 2E could thus have typically a size of 47 bits (which is almost the same as the size of the DCI format 1, 1A (with CIF field)). In that respect it should be noted that by eliminating the resource block allocation field from the new DCI format 2E, the size of same will be independent of the system bandwidth, which not only facilitates blind decoding but also allows cross carrier scheduling from any search space as explained already before in detail.

Although the examples for the new DCI format 2E, based on the already defined DCI formats of the "2" family is given above, the new DCI format 2E can have even less fields. The new DCI format 2E can vary depending on what fields shall be included. When making a comparison with the DCI formats 2, 2A, 2B, 2C, 2D, already defined in 3GPP, such a new DCI format 2E could include at least one of the following fields: Carrier Indicator, TPC command for PUCCH, Downlink Assignment Index, HARQ process number, Transport Block to codeword swap flag, respectively Modulation and Coding Scheme, New data indicator, and redundancy version for transport block 1 and 2, Pre-coding information, HARQ-ACK resource offset, Scrambling Identity, SRS request, scrambling identity and number of layers, Antenna port(s)

Especially when taking into account the special circumstances of unlicensed carriers, some of the above mentioned fields may not be necessary to be included in the new DCI format 2E. For example, it has not been decided whether uplink transmission shall even be supported for unlicensed carriers (i.e., unlicensed carriers may be downlink only), in which case, e.g., the TPC command for the PUCCH is superfluous. Also, since a large bandwidth resource allocation has a high data capacity that enables transmission of sufficient redundancy within the same subframe, it may be unnecessary to indicate a redundancy versions explicitly for each transport block in the DCI format, in which case the redundancy version could be fixed to a certain value. Likewise, a lack of sufficiently accurate channel state information at the radio control unit can make the Pre-coding information field become unnecessary; alternatively, it could be reduced in size, since with fewer choices the sensitivity to errors cause by inaccuracy diminishes. As can be seen from these examples, a possible new DCI format 2E can be made very short, if needed.

An exemplary DCI format 2E (similar to DCI format 2) could for example include the following fields: Carrier Indicator, Downlink Assignment Index, HARQ process number, Transport Block to codeword swap flag, respectively Modulation and Coding Scheme, New Data Indicator, and Redundancy Version for transport block 1 and 2, Pre-coding information, HARQ-ACK resource offset Another exemplary DCI format 2E only includes: Carrier Indicator (3 bits), TPC command for PUCCH (2 bits), HARQ process number (3-4 bits), Antenna port(s), scrambling identity and number of layers (3 bits), respectively Modulation and Coding Scheme, New data indicator, and redundancy version for transport block 1 and 2 (8 bits per transport block), and Pre-coding information (2 bits). The size of this exemplary DCI format 2E would be 47 bits, such that the aggregation level 1 would have a code rate of 0.65 (and therefore a gain of 1.67 dB) compared to the DCI format 2C.

Alternatively, or in addition to DCI format 2E, a new DCI format, exemplarily termed "1E", can be defined for allocating such predetermined radio resources, which, e.g., could be similar to DCI format 1A (see background section), but without the corresponding resource block assignment field, in which case the following fields would be included: Carrier Indicator, Modulation and Coding Scheme, HARQ process number, New Data Indicator, Redundancy Version, TPC command for PUCCH, Downlink Assignment Index, SRS request, HARQ-ACK resource offset. The potential gain of this exemplary DCI format 1E against DCI format 1A is 14-15 (out of 49) bits, i.e., around 1.6 dB gain.

Again, an even shorter DCI format 1E might be also possible, e.g., not including the field TPC command for PUCCH, and/or SRS request, thus further increasing the gain. A localized/distributed VRB assignment flag is particularly redundant if the predetermined radio resource occupies a large part of the respective system bandwidth (e.g., 40% or more), since such large resource allocations span a substantial part of the bandwidth and therefore not much more benefit can be obtained from a dynamic choice of localized or distributed radio resources. Conversely, a flag for a DCI Format differentiation could be necessary if the sizes of two different DCI Formats are to be aligned such that blind decoding efforts can be saved; this should be understood as being applicable to any new DCI formats within the scope of this disclosure. It should also be generally understood that the necessity of fields for a new DCI format may also depend on the applicable transmission mode for which it is used or where it is transmitted. For example, a 'HARQ-ACK resource offset' information can be present in DCI Format 2E when transmitted on EPDCCH but not when transmitted on PDCCH; likewise a 'PDSCH RE Mapping and Quasi-Co-Location Indicator' can be present of DCI Format 2E is transmitted to a UE whose carrier is configured to transmission mode 10, but not when it is transmitted to a UE whose carrier is configured to a different transmission mode.

Alternatively, or in addition to the downlink DCI formats 2E and 0, a new DCI format, exemplarily termed "0A", for allowing uplink communication can be defined for allocation of the predetermined radio resources using single antenna port transmissions in uplink transmission modes 1 or 2. An exemplary DCI format 0A could thus be similar to DCI format 0 (already known from the current standardization, see background), but without the RBA and Hopping field. The exemplary DCI format 0A would thus include the fields: Carrier Indicator—Frequency Hopping Flag, Modulation and Coding Scheme, and Redundancy Version, New Data indicator, TPC Command for scheduled PUSCH, Cyclic Shift for DM RS and OCC index, UL index, Downlink Assignment Index (DAI), CSI request, SRS request, Resource Allocation Type. The potential gain of DCI format 0A against DCI format 0 is 14 (out of 49) bits, i.e., around 1.6 dB gain.

Again, an even shorter DCI format 0A might also be possible, e.g., not including the field CSI Request, SRS request, and/or Resource Allocation Type, thus further increasing the gain. A frequency hopping flag is particularly redundant if the predetermined radio resource occupies a large part of the respective system bandwidth (e.g., 50% or more), since such a large resource allocations span a substantial part of the bandwidth and therefore not much more benefit can be obtained from a dynamic choice of localized or distributed radio resources. Likewise, for large resource allocations, the gain of multi-cluster resource assignments supported by uplink resource allocation type 1 compared to the single cluster resource assignment supported by uplink resource allocation type 0 becomes negligible, so that the corresponding field is preferably not included in such a shortened DCI format for uplink transmissions.

As already discussed in the background section in connection with the DCI formats, not all of the elements of the above exemplary DCI formats 2E, 1E, 0A need to be always included into the DCI message; the presence of some of the elements may be configurable for example by RRC parameters. This is at least the case for the Carrier Indicator field, which is only necessary in case of cross carrier scheduling, when the UE is configured appropriately.

The combination of the new DCI formats 1E and 0A is particularly advantageous in order to achieve small DCI sizes for blind decoding. In such a combination, a reduced blind decoding effort could be beneficially realized by aligning the DCI sizes for these two formats (e.g., by padding bits, if necessary) and including a flag for format 0A/1E differentiation.

Overall, short and efficient DCI format(s) are described above for resource allocation, preferably in connection with resources on unlicensed carriers. For small cells this enables the transmission of the scheduling information with very small aggregation levels, avoiding (E)PDCCH resource shortage or collisions. For higher aggregation levels, this could also extend the coverage of the DCI such that this could even be applied to coverage extension of DCI transmissions on predefined resource blocks. Since the number of codebits for an aggregation level is fixed, an aggregation level for a DCI payload of size A bits has a wider coverage than the same aggregation level for a DCI payload of size B bits for A<B, because the obtained code rate for the A bits is smaller, which increases the redundancy, and therefore achieves a higher coding gain, resulting in a lower error rate at the same coverage or an extended coverage for the same error rate as for B bits.

As explained before, one particular implementation allows for several different predetermined radio resources, out of which one is to be selected for the actual allocation of resources. In this particular example, one option was to allow the DCI message to perform the selection. Accordingly, an appropriate field can be provided in the new DCI formats 2E, 1E, 0A. Taking as example the 4 different predetermined resources of FIG. 12, the new DCI formats could have an additional 2-bit field allowing to distinguish between these 4 predetermined radio resources, such that the user terminal, upon successfully decoding the DCI message, can select the appropriate predetermined resource based on this additional 2-bit field; for example in the following way:

| Field Value | Resource block assignment |
|---|---|
| '00' | The first predetermined radio resources, e.g., configured by the higher layers |
| '01' | The second predetermined radio resources, e.g., configured by the higher layers |
| '10' | The third predetermined radio resources, e.g., configured by the higher layers |
| '11' | The fourth predetermined radio resources, e.g., configured by the higher layers |

However, even if including such a field in the new DCI formats, this will still be advantageous over the prior art DCI formats since still a lot of bits can be saved and still the size of the DCI format remains independent of the bandwidth.

Introducing new DCI formats, as discussed above, would increase the blind decoding effort on the UE side which however can be mitigated or completely avoided according to further implementations discussed below. As discussed in the background section, the UEs are configured partly based on the transmission modes as to which DCI formats are to be blind decoded in the corresponding (E)PDCCH. In other words, there is an association between a particular transmission mode, with which the UE is configured, and the DCI formats for which blind decoding is to be performed.

According to further implementations, these associations between the transmission modes and the particular DCI formats according to the prior art are adapted to accommodate the new DCI format(s) in such a way that the blind decoding effort is not increased in the UE. This can be done exemplarily as follows.

In case of the new DCI format 2E, this new DCI format 2E can replace one of the corresponding DCI formats of family 2 in the respective Transmission Modes 3, 4, 8, 9, 10. In particular, the corresponding Table 7.1-5 for PDCCH and PDSCH configured by C-RNTI (presented in the background section) could be adapted as follows. Please note that the following adapted table exemplarily only shows the transmission modes which are changed according to this implementation while those transmission modes 1, 2, 5, 6, 7 that are not changed (since they do not include a corresponding DCI of format family 2), remain the same as in the table in the background section. Alternatively to the presentation in the tables, it should be understood that a further distinction could be done by naming, e.g., the new DCI Format for transmission mode 8 'DCI Format 2E', for transmission mode 9 'DCI Format 2F', for transmission mode 10 'DCI Format 2G', etc.; these new DCI Formats should be understood to be following what is outlined for DCI Format 2E (or 0A, 1E, as applicable) mutatis mutandis.

TABLE 7.1-5

PDCCH and PDSCH configured by C-RNTI (only TMs 3, 4, 8, 9, 10)

| Transmission mode | DCI format | Search Space | Transmission scheme of PDSCH corresponding to PDCCH |
|---|---|---|---|
| Mode 3 | DCI format 1A | Common and UE specific by C-RNTI | Transmit diversity (see subclause 7.1.2) |
| | DCI format 2E | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
| | DCI format 2E | UE specific by C-RNTI | Closed-loop spatial multiplexing (see subclause 7.1.4)or Transmit diversity (see subclause 7.1.2) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 2E | UE specific by C-RNTI | Dual layer transmission, port 7 and 8 (see subclause 7.1.5A) or single-antenna port, port 7 or 8 (see subclause 7.1.1) |
| Mode 9 | DCI format 1A | Common and UE specific by C-RNTI | Non-MBSFN subframe: If the number of PBCH antenna ports is one, Single-antenna port, port 0 is used (see subclause 7.1.1), otherwise Transmit diversity (see subclause 7.1.2) MBSFN subframe: Single-antenna port, port 7 (see subclause 7.1.1) |
| | DCI format 2E | UE specific by C-RNTI | Up to 8 layer transmission, ports 7-14 (see subclause 7.1.5B) or single-antenna port, port 7 or 8 (see subclause 7.1.1) |
| Mode 10 | DCI format 1A | Common and UE specific by C-RNTI | Non-MBSFN subframe: If the number of PBCH antenna ports is one, Single-antenna port, port 0 is used (see subclause 7.1.1), otherwise Transmit diversity (see subclause 7.1.2) MBSFN subframe: Single-antenna port, port 7 (see subclause 7.1.1) |
| | DCI format 2E | UE specific by C-RNTI | Up to 8 layer transmission, ports 7-14 (see subclause 7.1.5B) or single-antenna port, port 7 or 8 (see subclause 7.1.1) |

The same changes to prior art Table 7.1-5 above can be basically applied to Table 7.1-5A for the EPDCCH and PDSCH configured by C-RNTI; see table below which again only shows those transmission modes which are changed.

TABLE 7.1-5A

EPDCCH and PDSCH configured by C-RNTI (only TMs 3, 4, 8, 9, 10)

| Transmission mode | DCI format | Search Space | Transmission scheme of PDSCH corresponding to EPDCCH |
|---|---|---|---|
| Mode 3 | DCI format 1A | UE specific by C-RNTI | Transmit diversity (see subclause 7.1.2) |
| | DCI format 2E | UE specific by C-RNTI | Large delay CDD (see subclause 7.1.3) or Transmit diversity (see subclause 7.1.2) |
| Mode 4 | DCI format 1A | UE specific by C-RNTI | Transmit diversity (see subclause 7.1.2) |
| | DCI format 2E | UE specific by C-RNTI | Closed-loop spatial multiplexing (see subclause 7.1.4) or Transmit diversity (see subclause 7.1.2) |
| Mode 8 | DCI format 1A | UE specific by C-RNTI | If the number of PBCH antenna ports is one, Single-antenna port, port 0 is used (see subclause 7.1.1), otherwise Transmit diversity (see subclause 7.1.2) |
| | DCI format 2E | UE specific by C-RNTI | Dual layer transmission, port 7 and 8 (see subclause 7.1.5A) or single-antenna port, port 7 or 8 (see subclause 7.1.1) |
| Mode 9 | DCI format 1A | UE specific by C-RNTI | Non-MBSFN subframe: If the number of PBCH antenna ports is one, Single-antenna port, port 0 is used (see subclause 7.1.1), otherwise Transmit diversity (see subclause 7.1.2) MBSFN subframe: Single-antenna port, port 7 (see subclause 7.1.1) |
| | DCI format 2E | UE specific by C-RNTI | Up to 8 layer transmission, ports 7-14 (see subclause 7.1.5B) or single-antenna port, port 7 or 8 (see subclause 7.1.1) |
| Mode 10 | DCI format 1A | UE specific by C-RNTI | Non-MBSFN subframe: If the number of PBCH antenna ports is one, Single-antenna port, port 0 is used (see subclause 7.1.1), otherwise Transmit diversity (see subclause 7.1.2) MBSFN subframe: Single-antenna port, port 7 (see subclause 7.1.1) |
| | DCI format 2E | UE specific by C-RNTI | Up to 8 layer transmission, ports 7-14 (see subclause 7.1.5B) or single-antenna port, port 7 or 8 (see subclause 7.1.1) |

The same applies to Tables 7.1-6 and Tables 7.1-6A regarding PDCCH and EPDCC for SPS C-RNTI (see background section). The amended tables 7.1-6, and 7.1-6A are not explicitly shown, since a skilled person will be readily able to replace the corresponding DCI formats 2, 2A/2B/2C/2D with new DCI format 2E.

When replacing the DCI formats of family 2 as explained above, the DCI format 1A still remains in all the transmission modes 3, 4, 8, 9, 10, thus allowing to efficiently schedule a single transport block with frequency selective resource assignments on the unlicensed carrier if needed.

According to a different implementation, the new DCI format 2E shall replace the DCI format 0 and 1A throughout all transmission modes; particularly, for the case where unlicensed carriers will not support uplink communications such that uplink DCI format 0 will not be usable. However, DCI format 0 has the same size as downlink DCI format 1A (thus, the need for the field: flag for format 0/format 1A differentiation included in the DCI formats 0 and 1A; see background section) and will be effectively also blind decoded when .blind decoding for DCI format 1A.

The corresponding Tables 7.1-5, 7.1-5A, 7.1-6, and 7.1-6A for downlink resource are thus adapted. This is exemplarily shown for transmission mode 10 of Table 7.1-5, but is equally applicable to the other transmission modes and to the other tables.

TABLE 7.1-5

PDCCH and PDSCH configured by C-RNTI (only TM 10)

| Transmission mode | DCI format | Search Space | Transmission scheme of PDSCH corresponding to PDCCH |
|---|---|---|---|
| Mode 10 | DCI Format 2E | UE specific by C-RNTI | Up to 8 layer transmission, ports 7-14 (see subclause 7.1.5B) or single-antenna port, port 7 or 8 (see subclause 7.1.1) |
| | DCI format 2D | UE specific by C-RNTI | Up to 8 layer transmission, ports 7-14 (see subclause 7.1.5B) or single-antenna port, port 7 or 8 (see subclause 7.1.1) |

This is similarly applicable to the other transmission modes of this table. It should be also noted that the corresponding Tables 8.3, 8-3A, 8-5, and 8-5A of TS 36.213 as discussed in the background section would be adapted to delete DCI Format 0 therefrom.

It should be understood that alternatively to the above, DCI format 1A could be kept for the common search space but is replaced by DCI format 2E in the UE-specific search space, as shown hereafter; the benefit is that the common search space can be used for resource assignments by DCI format 0/1A, however at the cost of the necessary blind decoding attempts in the common search space.

TABLE 7.1-5

PDCCH and PDSCH configured by C-RNTI (only TM 10)

| Transmission mode | DCI format | Search Space | Transmission scheme of PDSCH corresponding to PDCCH |
|---|---|---|---|
| Mode 10 | DCI format 1A | Common | Non-MBSFN subframe: If the number of PBCH antenna ports is one, Single-antenna port, port 0 is used (see subclause 7.1.1), otherwise Transmit diversity (see subclause 7.1.2) MBSFN subframe: Single-antenna port, port 7 (see subclause 7.1.1) |
| | DCI Format 2E | UE specific by C-RNTI | Up to 8 layer transmission, ports 7-14 (see subclause 7.1.5B) or single-antenna port, port 7 or 8 (see subclause 7.1.1) |
| | DCI format 2D | UE specific by C-RNTI | Up to 8 layer transmission, ports 7-14 (see subclause 7.1.5B) or single-antenna port, port 7 or 8 (see subclause 7.1.1) |

One advantage is that the DCI formats 2/2A/2B/2C/2D in the various transmission modes can still be used to schedule 1 or 2 transport blocks with a frequency-selective resource assignment on the unlicensed carrier.

According to a still further different implementation, the new DCI format 2E shall replace only DCI format 0. Correspondingly, Tables 8.3, 8-3A, 8-5, and 8-5A of TS 36.213 as discussed in the background section would be adapted to delete DCI Format 0 therefrom. The corresponding Tables 7.1-5, 7.1-5A, 7.1-6, and 7.1-6A for downlink resource are thus extended to additionally include the new DCI format 2E; this is exemplarily shown for transmission mode 10 of Table 7.1-5, but is equally applicable to the other transmission modes and to the other tables.

TABLE 7.1-5

PDCCH and PDSCH configured by C-RNTI (only TM 10)

| Transmission mode | DCI format | Search Space | Transmission scheme of PDSCH corresponding to PDCCH |
|---|---|---|---|
| Mode 10 | DCI format 1A | Common and UE specific by C-RNTI | Non-MBSFN subframe: If the number of PBCH antenna ports is one, Single-antenna port, port 0 is used (see subclause 7.1.1), otherwise Transmit diversity (see subclause 7.1.2) MBSFN subframe: Single-antenna port, port 7 (see subclause 7.1.1) |
| | DCI format 2D | UE specific by C-RNTI | Up to 8 layer transmission, ports 7-14 (see subclause 7.1.5B) or single-antenna port, port 7 or 8 (see subclause 7.1.1) |
| | DCI format 2E | UE specific by C-RNTI | Up to 8 layer transmission, ports 7-14 (see subclause 7.1.5B) or single-antenna port, port 7 or 8 (see subclause 7.1.1) |

One additional bit is necessary to distinguish DCI format 2E from DCI format 1A. Furthermore, additional padding bits in DCI Format 2E or 1A might be required for the smaller DCI format to align the sizes.

Alternatively, instead of modifying the relation between existing transmission modes and the DCI formats, one or more new transmission modes could be defined (e.g., transmission mode 11) specifically for new DCI format 2E. Such new transmission modes could follow straightforwardly from the transmission mode(s) already defined. For example, a corresponding table for establishing the relation between the Transmission mode, DCI Format, Search Space, Transmission scheme could be the following:

TABLE 7.1-5

PDCCH and PDSCH configured by C-RNTI (only TM 11)

| Transmission mode | DCI format | Search Space | Transmission scheme of PDSCH corresponding to PDCCH |
|---|---|---|---|
| Mode 11 | DCI format 1A | Common and UE specific by C-RNTI | Non-MBSFN subframe: If the number of PBCH antenna ports is one, Single-antenna port, port 0 is used (see subclause 7.1.1), otherwise Transmit diversity (see subclause 7.1.2) MBSFN subframe: Single-antenna port, port 7 (see subclause 7.1.1) |

TABLE 7.1-5-continued

PDCCH and PDSCH configured by C-RNTI (only TM 11)

| Transmission mode | DCI format | Search Space | Transmission scheme of PDSCH corresponding to PDCCH |
|---|---|---|---|
| | DCI format 2E | UE specific by C-RNTI | Up to 8 layer transmission, ports 7-14 (see subclause 7.1.5B) or single-antenna port, port 7 or 8 (see subclause 7.1.1) |

Above it was explained how a new DCI format 2E could be associated with different transmission modes so as to advantageously not increase the blind decoding effort at the UE side. The same concept similarly applies mutatis mutandis to the other mentioned new DCI formats 1E, and 0A.

In particular, the new DCI format 1E could replace DCI format 1A from the corresponding tables 7.1-5, 7.1-5A, 7.1-6, and 7.1-6A described in detail in the background section, however with the additional restriction that DCI format 1E would only be applicable in the UE-specific search space (since the DCI size detected in the common search space should be identical for all UEs, and it is expected that this will not be changed from the current DCI Format 0/1A). This is exemplarily shown for transmission mode 10 of Table 7.1-5, but is equally applicable to the other transmission modes and to the other tables.

TABLE 7.1-5

PDCCH and PDSCH configured by C-RNTI (only TM 10)

| Transmission mode | DCI format | Search Space | Transmission scheme of PDSCH corresponding to PDCCH |
|---|---|---|---|
| Mode 10 | DCI format 1E | UE specific by C-RNTI | Non-MBSFN subframe: If the number of PBCH antenna ports is one, Single-antenna port, port 0 is used (see subclause 7.1.1), otherwise Transmit diversity (see subclause 7.1.2) MBSFN subframe: Single-antenna port, port 7 (see subclause 7.1.1) |
| | DCI format 2D | UE specific by C-RNTI | Up to 8 layer transmission, ports 7-14 (see subclause 7.1.5B) or single-antenna port, port 7 or 8 (see subclause 7.1.1) |

Alternatively, DCI format 1A could be kept for the common search space but is replaced by DCI format 1E in the UE-specific search space, as shown hereafter; the benefit is that the common search space can be used for resource assignments by DCI format 0/1A, however at the cost of the necessary blind decoding attempts in the common search space.

| Transmission mode | DCI format | Search Space | Transmission scheme of PDSCH corresponding to PDCCH |
|---|---|---|---|
| Mode 10 | DCI format 1A | Common | Non-MBSFN subframe: If the number of PBCH antenna ports is one, Single-antenna port, port 0 is used (see subclause 7.1.1), otherwise Transmit diversity (see subclause 7.1.2) |

-continued

| Transmission mode | DCI format | Search Space | Transmission scheme of PDSCH corresponding to PDCCH |
|---|---|---|---|
| | DCI Format 1E | UE specific by C-RNTI | MBSFN subframe: Single-antenna port, port 7 (see subclause 7.1.1)<br>Non-MBSFN subframe: If the number of PBCH antenna ports is one, Single-antenna port, port 0 is used (see subclause 7.1.1), otherwise Transmit diversity (see subclause 7.1.2)<br>MBSFN subframe: Single-antenna port, port 7 (see subclause 7.1.1) |
| | DCI format 2D | UE specific by C-RNTI | Up to 8 layer transmission, ports 7-14 (see subclause 7.1.5B) or single-antenna port, port 7 or 8 (see subclause 7.1.1) |

A further alternative would be that DCI format 0 is replaced by new DCI format 1E, such that Tables 7.1-5, 7.1-5A, 7.1-6, and 7.1-6A would be extended with the DCI format 1E, and tables 8.3, 8-3A, 8-5, and 8-5A of TS 36.213 as discussed in the background section would be adapted to delete DCI Format 0 therefrom.

Correspondingly, new DCI format 0A would then replace DCI format 0 from the corresponding tables of TS 36.213 as introduced in the background section, particularly Tables 8-3, 8-3A, 8-5, and 8-5A relating to the uplink.

Figure 11:
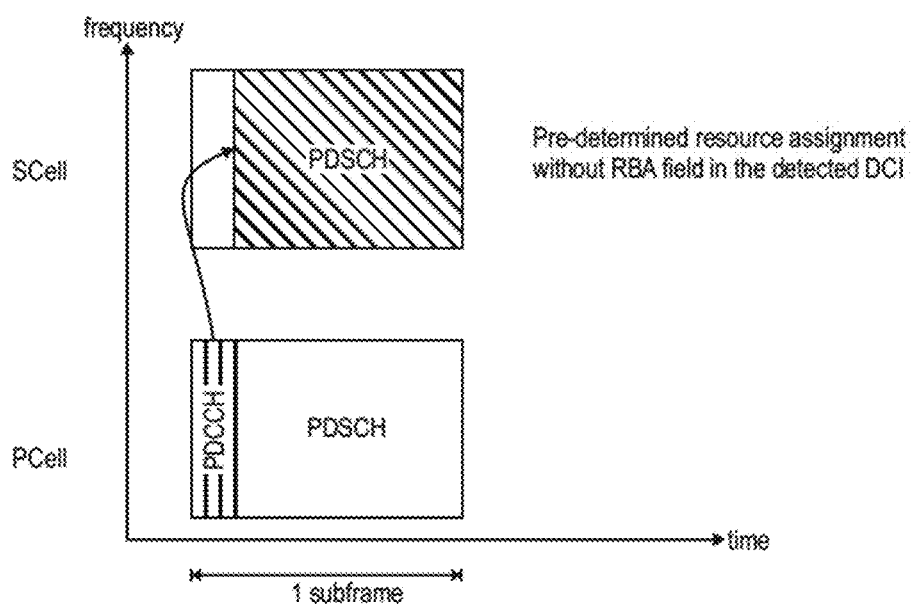
FIG. 11 illustrates cross-carrier scheduling based on a DCI message transmitted on the PCell for allocating the predetermined radio resources of the PDSCH in an SCell, where the predetermined radio resources are a complete bandwidth of the carrier.
Figure 12:
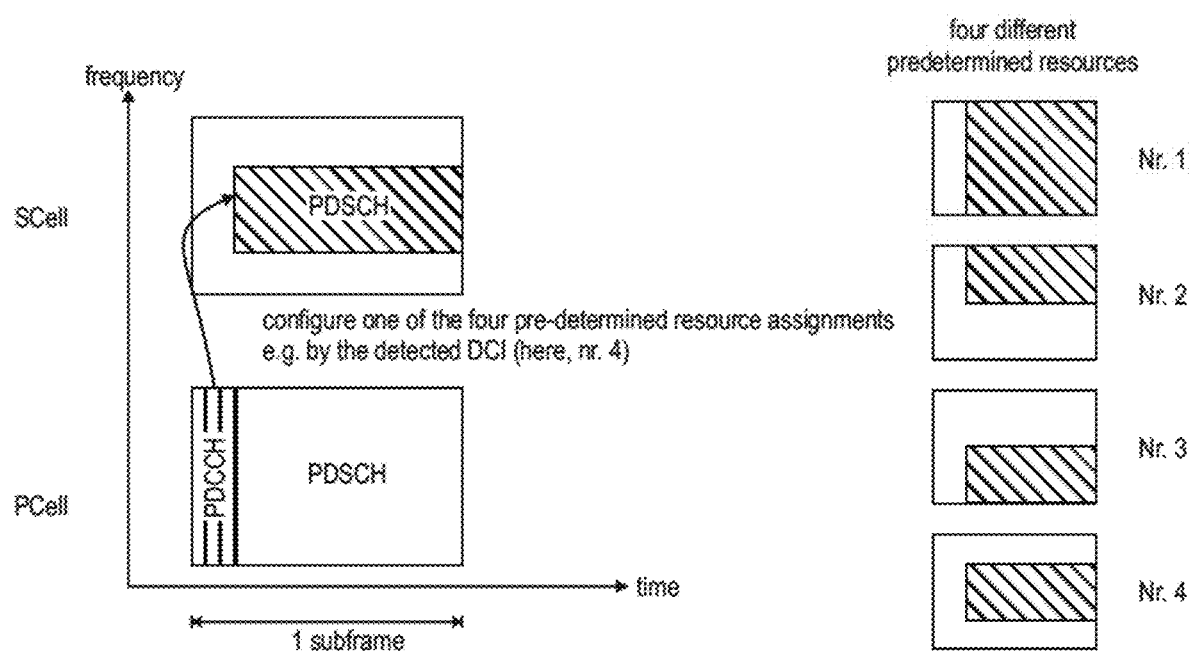
FIG. 12 illustrates cross carrier scheduling based on a DCI message transmitted on the PDCCH of the PCell for allocating predetermined radio resources of the PDSCH in an SCell, were 4 different determined radio resources are defined and only one is actually allocated.

FIG. 11 is an exemplary diagram illustrating how cross-carrier scheduling is applied for the improved radio resource allocation method of the discussed embodiments. Accordingly, a DCI message transmitted by the eNodeB in the PDCCH of the licensed PCell, in particular transmitted in the corresponding search space, is detected by the UE, and associated with the corresponding predetermined resources stored in the UE. In the exemplary illustration of FIG. 11 it is assumed that downlink resources are assigned to the UE in which case, the predetermined radio resources (in this case the whole bandwidth) are used by the eNodeB to provide downlink data via the PDSCH of the unlicensed SCell to the UE.

FIG. 12 is another exemplary diagram mainly differing from FIG. 11 in that it is assumed that there are 4 different predetermined radio resources and in that the DCI message received on the PDCCH of the PCell, indicates which of the 4 different predetermined resources are to be used for the downlink reception.

According to further implementations, the transmission scheme can be adapted for CRS-based transmission schemes such as those indicated especially by DCI format 1A. Since CRS-based transmission schemes could be unreliable due to CRS absence, it is better to rely on DM-RS based transmissions schemes. The CRS-based transmissions indicated by, e.g., DCI format 1A assignments are therefore not usable as fallback resource assignments in case of having no CRS but, e.g., only DM-RS available for estimating the channel. This can particularly occur in case of unlicensed carriers, but could also apply to licensed carriers in the future to avoid the CRS overhead. In order to avoid this problem, it is possible to specify that the transmission scheme indicated by, e.g., DCI format 1A for such a carrier is "Single-antenna port 7" (or another DM-RS port). The condition could be modified, for example by referring to 0 PBCH antenna ports (0 PBCH antenna ports would indicate an unlicensed carrier), or by defining unlicensed carrier subframes as MBSFN subframes. Likewise, transmission schemes such as transmit diversity would be modified to rely on DM-RS ports such as 7-8, or 7-10.

The transmission scheme adaptation for CRS-based transmission schemes can likewise be applied to transmissions indicated by, e.g., the new DCI Format 1E, such that it indicates 'Single antenna port, port 7 (as in subclause 7.1.1 of 3GPP TS 36.213). In further embodiments, the predetermined resources are representing one of P RBG subsets, where P is preferably the RBG size as defined in LTE. An RBG subset p, where 0<=p<P, consists of every Pth RBG starting from RBG #p. The subset p is therefore the predetermined resource that is preferably conveyed to the UE by higher layer signaling or any other mechanism discussed above. The RBA of the DCI then includes a bitmap, where each bit of the bitmap addresses a single RB in the selected RBG subset in such a way that MSB to LSB of the bitmap are mapped to the RBs in the increasing frequency order. The RB is allocated to the UE if the corresponding bit value in the bit field is 1, the RB is not allocated to the UE otherwise.

The predetermined resources may further account for a shift of RBs that are indicated by the DCI. Alternatively, such a shift is indicated by one bit in the DCI, where the one bit is used to indicate the shift, where the shift is applied when determining from the RBA field which RBs are assigned, for example as outlined in clause 7.1.6.2 of 3GPP TS 36.213.

Hardware and Software Implementation of the Present Disclosure

Other exemplary embodiments relate to the implementation of the above described various embodiments using hardware and software. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication apparatus for performing communication with a radio control entity in a communication system, the communication apparatus comprising:
   a receiver which, in operation, receives a downlink control information (DCI) message of a particular format from the radio control entity, and
   circuitry which, in operation, identifies first radio resources associated with the received DCI message of the particular format, and performs communication between the communication apparatus and the radio control entity using the identified first radio resources via a particular carrier,
   wherein the particular carrier is an unlicensed carrier,
   wherein the first radio resources are defined according to a particular resource allocation type,
   wherein the particular resource allocation type is a resource allocation type, from a plurality of uplink and downlink resource allocation types, which is specific to the first radio resources for use in connection with the particular carrier, and
   wherein the plurality of uplink and downlink resource allocation types includes one or more of downlink resource allocation types 0, 1, and 2 according to a 3rd Generation Partnership Project (3GPP) Long Term Evolution (LTE) specification and at least one of the one or more of downlink resource allocation types 0, 1, and 2 is reused for defining the first radio resources for use in connection with the particular carrier.

2. The communication apparatus according to claim 1, wherein the size of the DCI message is independent from a bandwidth of the particular carrier.

3. The communication apparatus according to claim 1, wherein the receiver, in operation, receives the DCI message via the particular carrier, or
   receives the DCI message via an other carrier, in which case the DCI message additionally indicates the DCI message is related to the particular carrier, by use of a carrier identification in a carrier identification field of the DCI message,
   wherein the other carrier is a licensed carrier of the primary cell of the communication apparatus.

4. The user communication apparatus according to claim 1, wherein the particular format of the DCI message is a format for a downlink communication, and the identified first radio resources are used by the communication apparatus to receive the downlink communication from the radio control entity, wherein the DCI message includes:
   a carrier identification field in a case of cross carrier scheduling; or
   a transmit power command field in a case transmit power for transmitting in the uplink is to be adapted; or
   a Hybrid Automatic Repeat ReQuest, HARQ, process number; or
   at least one modulation and coding scheme field; or
   at least one new data indicator field; or
   at least one redundancy version field; or
   a precoding information field.

5. The communication apparatus according to claim 1, wherein the particular format of the DCI message is a format for an uplink communication, and the identified first radio resources are used by the communication apparatus to transmit the uplink communication to the radio control entity, wherein the DCI message includes:
   a carrier identification field in a case of cross carrier scheduling; or
   a transmit power command field in a case transmit power for transmitting in the uplink is to be adapted; or
   at least one field for indicating a modulation and coding scheme; or
   at least one new data indicator field; or
   a field for indicating a Cyclic shift for demodulation reference signal; or
   a precoding information field.

6. The communication apparatus according to claim 1, wherein the first radio resources include:
   all resource blocks of the particular carrier respectively for one or more subframes, or
   a part of all resource blocks of the particular carrier respectively for one or more subframes,
   wherein said part of all resource blocks is either:
      a plurality of contiguous resource blocks at a lower frequency end of the carrier, or
      a plurality of contiguous resources blocks at a higher frequency end of the carrier, or
      a plurality of contiguous resource blocks around a middle frequency of the carrier.

7. The communication apparatus according to claim 1, wherein the communication apparatus is configured with the first radio resources for the particular carrier:
   in a fixed manner by a 3rd Generation Partnership Project (3GPP) specification, or
   through higher layer signaling, or
   via a radio resource control (RRC) message,
   wherein the 3GPP specification, the higher layer signaling, or the RRC message additionally indicates a resource allocation type of the first radio resources.

8. The communication apparatus according to claim 1, wherein second radio resources are configured in the communication apparatus for use in connection with the particular carrier and are associated with the particular format of the DCI message, and
   the communication apparatus is preconfigured with at least one of the first or second radio resources by the radio control entity, and upon receiving the DCI message of the particular format by the receiver, said at least one of the first or second radio resources are identified by the circuitry and used for communication between the communication apparatus and the radio control entity via the particular carrier, or
   the communication apparatus is allocated one of the at least one of the first or second radio resources based on the DCI message of the particular type, received by the receiver from the radio control entity, the received DCI message indicating one or more of the at least one of the first or second radio resources that shall be used for communication over the particular carrier.

9. The communication apparatus according to claim 1, wherein at least one of the receiver and circuitry, in operation,
attempts to decode DCI messages of the particular format in a search space assigned to the communication apparatus, and
successfully decodes the DCI message of the particular format, and
upon successfully decoding the DCI message of the particular format and identifying the first radio resources associated with this received DCI message, the identified first radio resources are allocated to the communication apparatus and used for communication between the communication apparatus and the radio control entity via the particular carrier.

10. The communication apparatus according to claim 1, wherein the communication apparatus attempts to decode DCI messages of different formats based on an association between different transmission modes and the DCI messages of the different formats,
wherein the communication apparatus operates in at least one transmission mode that is associated with the DCI messages of different formats, and the communication apparatus attempts to decode one or more of the DCI messages of different formats associated with the transmission mode,
wherein the at least one transmission mode is also associated with the particular format of the DCI message for use with the particular carrier, and the communication apparatus performs attempts to decode a DCI message of the particular format on a particular carrier,
wherein according to an association between the at least one transmission mode and the particular format of the DCI message the communication apparatus attempts to decode the DCI message of the particular format only on the particular carrier.

11. The communication apparatus according to claim 1, wherein the first radio resources are configured for use with a licensed carrier, and the first radio resources are used for communication between the communication apparatus and the radio control entity via the licensed carrier, upon the communication apparatus receiving the DCI message of the particular format.

12. A method for performing communication between a communication apparatus and a radio control entity in a communication system, the communication apparatus comprising:
receiving a downlink control information (DCI) message of a particular format from the radio control entity;
identifying first radio resources associated with the received DCI message of the particular format; and
performing communication between the communication apparatus and the radio control entity using the identified first radio resources via a particular carrier,
wherein the particular carrier is an unlicensed carrier,
wherein the first radio resources are defined according to a particular resource allocation type,
wherein the particular resource allocation type is a resource allocation type, from a plurality of uplink and downlink resource allocation types, which is specific to the first radio resources for use in connection with the particular carrier, and
wherein the plurality of uplink and downlink resource allocation types includes one or more of downlink resource allocation types 0, 1, and 2 according to a 3rd Generation Partnership Project (3GPP) Long Term Evolution (LTE) specification and at least one of the one or more of downlink resource allocation types 0, 1, and 2 is reused for defining the first radio resources for use in connection with the particular carrier.

13. The method according to claim 12, wherein the particular format of the DCI message is a format for a downlink communication, and the identified first radio resources are used by the communication apparatus to receive the downlink communication from the radio control entity, wherein the DCI message includes:
a carrier identification field in a case of cross carrier scheduling; or
a transmit power command field in a case transmit power for transmitting in the uplink is to be adapted; or
a Hybrid Automatic Repeat ReQuest, HARQ, process number; or
at least one modulation and coding scheme field; or
at least one new data indicator field; or
at least one redundancy version field; or
a precoding information field.

14. The method according to claim 12, wherein the particular format of the DCI message is a format for an uplink communication, and the identified first radio resources are used by the communication apparatus to transmit the uplink communication to the radio control entity, wherein the DCI message includes:
a carrier identification field in a case of cross carrier scheduling; or
a transmit power command field in a case transmit power for transmitting in the uplink is to be adapted; or
at least one field for indicating a modulation and coding scheme; or
at least one new data indicator field; or
a field for indicating a Cyclic shift for demodulation reference signal; or
a precoding information field.

15. The method according to claim 12, wherein the first radio resources include:
all resource blocks of the particular carrier respectively for one or more subframes, or
a part of all resource blocks of the particular carrier respectively for one or more subframes,
wherein said part of all resource blocks is either:
a plurality of contiguous resource blocks at a lower frequency end of the carrier, or
a plurality of contiguous resources blocks at a higher frequency end of the carrier, or
a plurality of contiguous resource blocks around a middle frequency of the carrier.

16. The method according to claim 12, wherein second radio resources are configured in the communication apparatus for use in connection with the particular carrier and are associated with the particular format of the DCI message, and
the communication apparatus is preconfigured with at least one of the first or second radio resources by the radio control entity, and upon receiving the DCI message of the particular format received from the radio control entity, said at least one of the first or second radio resources are identified by the circuitry and used for communication between the communication apparatus and the radio control entity via the particular carrier, or
the communication apparatus is allocated one of the at least one of the first or second radio resources based on the DCI message of the particular type, received from the radio control entity, the received DCI message indicating one or more of the at least one of the first or second radio resources that shall be used for communication over the particular carrier.

17. The method according to claim 12, further comprising:
attempting to decode DCI messages of different formats based on an association between different transmission modes and the DCI messages of the different formats,
wherein the communication apparatus operates in at least one transmission mode that is associated with the DCI messages of different formats, and the communication apparatus attempts to decode one or more of the DCI messages of different formats associated with the transmission mode,
wherein the at least one transmission mode is also associated with the particular format of the DCI message for use with the particular carrier, and the communication apparatus attempts to decode a DCI message of the particular format on a particular carrier,
wherein according to an association between the at least one transmission mode and the particular format of the DCI message the communication apparatus attempts to decode the DCI message of the particular format only on the particular carrier.

18. The method according to claim 12, wherein the first radio resources are configured for use with a licensed carrier, and the first radio resources are used for communication between the communication apparatus and the radio control entity via the licensed carrier, upon the communication apparatus receiving the DCI message of the particular format.

* * * * *